United States Patent
Batsakis et al.

(10) Patent No.: US 11,436,116 B1
(45) Date of Patent: Sep. 6, 2022

(54) RECOVERING PRE-INDEXED DATA FROM A SHARED STORAGE SYSTEM FOLLOWING A FAILED INDEXER

(71) Applicant: Splunk Inc., San Francisco, CA (US)

(72) Inventors: Alexandros Batsakis, San Francisco, CA (US); Mehul Goyal, Pleasanton, CA (US); Ashish Mathew, San Mateo, CA (US); Douglas Rapp, San Francisco, CA (US); Igor Stojanovski, San Francisco, CA (US); Eric Woo, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 22 days.

(21) Appl. No.: 16/778,511

(22) Filed: Jan. 31, 2020

(51) Int. Cl.
| | |
|---|---|
| *G06F 11/00* | (2006.01) |
| *G06F 11/30* | (2006.01) |
| *G06F 16/182* | (2019.01) |
| *G06F 11/32* | (2006.01) |
| *G06F 16/17* | (2019.01) |

(52) U.S. Cl.
CPC ...... *G06F 11/3034* (2013.01); *G06F 11/3055* (2013.01); *G06F 11/3075* (2013.01); *G06F 11/326* (2013.01); *G06F 16/1734* (2019.01); *G06F 16/1824* (2019.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,451,025 B2 * | 9/2016 | Kazi | G06F 3/0683 |
| 10,127,258 B2 | 11/2018 | Lamas et al. | |
| 2006/0015773 A1 * | 1/2006 | Singh | G06F 11/2028 714/13 |
| 2017/0123856 A1 * | 5/2017 | Baptist | G06F 3/067 |
| 2017/0371568 A1 * | 12/2017 | Aravot | G06F 3/0614 |
| 2019/0098106 A1 | 3/2019 | Mungel et al. | |

(Continued)

OTHER PUBLICATIONS

Google Scholar/Patents—text refined (Year: 2021).*

(Continued)

*Primary Examiner* — Christopher S McCarthy
(74) *Attorney, Agent, or Firm* — Knobbe, Martens, Olson & Bear, LLP

(57) ABSTRACT

Systems and methods are described for improving data availability and/or resiliency of indexers of a data intake and query system. A data intake and query system can index large amounts of data using one or more indexers. An indexer can store a copy of the data that the indexer is assigned to process in the shared storage system, and a cluster master can track the storage of the data and the indexer assigned to process the data. In the event an indexer fails or is otherwise unable to index data that it has been assigned to index, the cluster master can assign one or more second indexers to process the data. The second indexer can download the data from the shared storage system.

30 Claims, 35 Drawing Sheets

(56) References Cited

U.S. PATENT DOCUMENTS

2020/0327953 A1* 10/2020 Fleming ............. G11C 29/4401
2021/0034571 A1*  2/2021 Bedadala ............. G06F 16/172

OTHER PUBLICATIONS

Google Scholar/Patents—search engine—text refined (Year: 2022).*
U.S. Appl. No. 16/778,427, filed Jan. 31, 2020, Batsakis et al.
U.S. Appl. No. 16/778,498, filed Jan. 31, 2020, Batsakis et al.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.
SLAML 10 Reports, Workshop on Managing Systems via Log Analysis and Machine Learning Techniques, ;login: Feb. 2011 Conference Reports.
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.

* cited by examiner

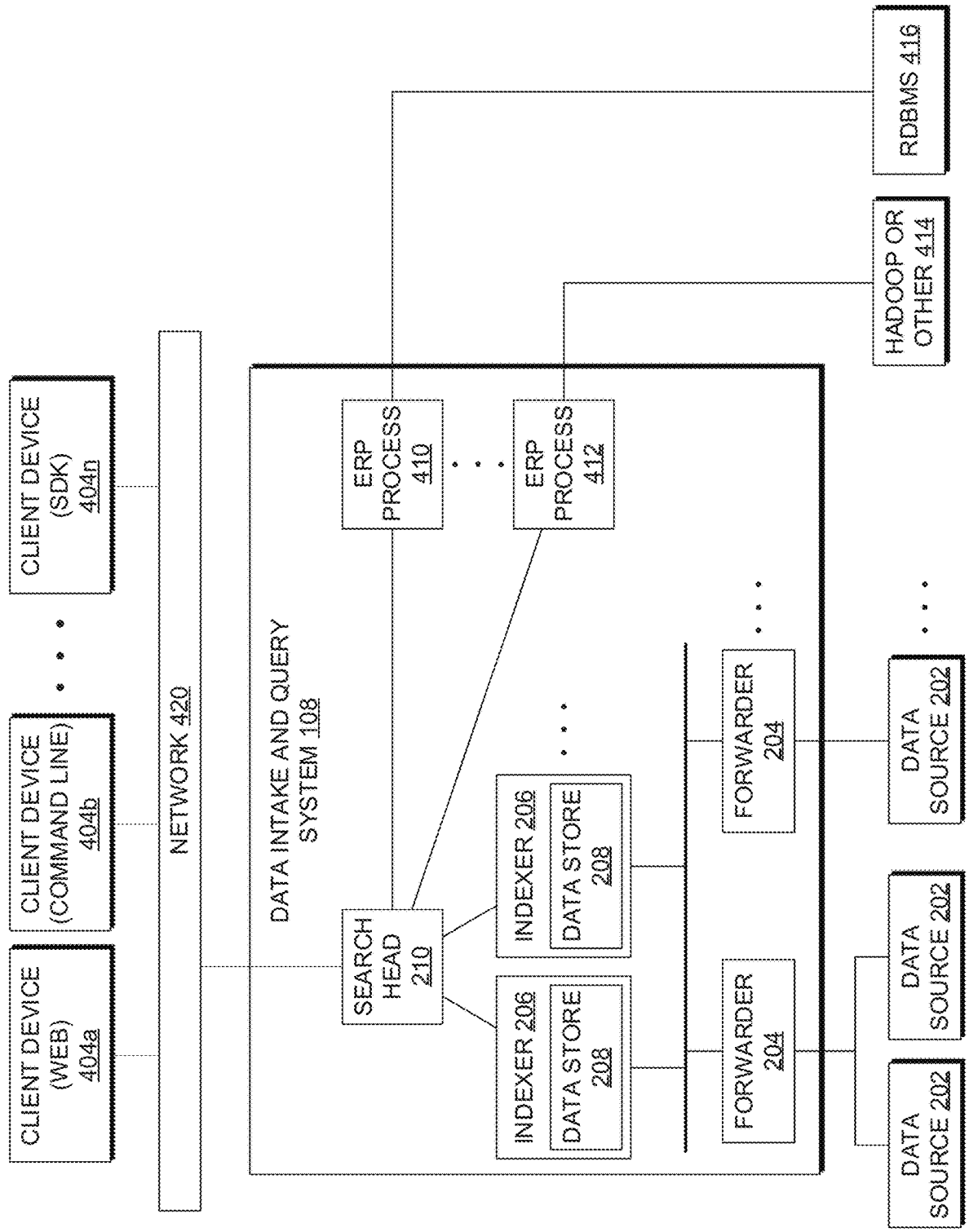

| Time 535 | Host 536 | Source 537 | Source Type 538 | Event 539 |
|---|---|---|---|---|
| 531 — 10/10/2000 1:55 p.m. | www1 | access.log | access_combined | 127.0.0.1 – frank [10/Oct/2000:13:55:36-0700] "GET/apache.gif HTTP/1.0" 200 2326 0.0947<br>540  541  542  545<br>543 |
| 532 — 10/10/2000 1:56 p.m. | www2 | access.log | access_combined | 127.0.0.1 – bob [10/Oct/2000:13:56:36-0700] "GET/mickey_mouse.gif HTTP/1.0" 200 2980 0.0899<br>546 |
| 533 — 10/10/2000 1:57 p.m. | www2 | access.log | access_combined | 127.0.0.1 – carlos [10/Oct/2000:13:57:36-0700] "GET/donald_duck.gif HTTP/1.0" 200 2900 0.0857 |
| 534 — 10/10/2000 1:58 p.m. | www2 | error.log | apache_error | [Sunday Oct 10 1:58:33 2010] [error] [client 127.10.1.1.015] File does not exist /home/reba/public_html/images/daffy_duck.gif |

FIG. 5C

| Row | Time | Host | Source | Source Type | Event |
|---|---|---|---|---|---|
| 55000 | 10/10/2016 1:55 p.m. | www1 | access.log | access_combined | 127.0.0.1 - frank [10/Oct/2016:13:55:36 -0700] "GET /apache.gif HTTP/1.0" 200 2326 0.0947 _731_ |
| 55001 | 10/10/2016 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 1:57 p.m. | www2 | access.log | access_combined | 127.0.0.1 - carlos [10/Oct/2016:13:57:36 -0700] "GET /donald_duck.gif HTTP/1.0" 200 2900 0.0857 _732_ |
| 55003 | 10/10/2016 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 1:59 p.m. | www1 | access.log | access_combined | 127.0.0.3 - virgil [10/Oct/2016:13:59:36 -0700] "GET /donald_duck.gif HTTP/1.0" 200 2900 0.0987 |
| 55005 | 10/10/2016 2:00 p.m. | www1 | access.log | access_combined | 127.0.0.1 - matt [10/Oct/2016:14:00:36 -0700] "GET /goofy.gif HTTP/1.0" 200 2920 0.0987 _733_ |
| 55006 | 10/10/2016 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 2:02 p.m. | www1 | access.log | access_combined | 127.0.0.1 - jack [10/Oct/2016:14:02:36 -0700] "GET /muppets.gif HTTP/1.0" 200 5000 0.0667 _734_ |

_723_

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

_722_

| Event Reference Value | Field Name | Field Value | User ID |
|---|---|---|---|
| 55000 | clientip | 127.0.0.1 | frank |
| 55005 | clientip | 127.0.0.1 | matt |

Data Summary

| Hosts (5) | Sources (8) | Sourcetypes (3) | | | ✕ | filter

| Host ≎ | | Count ≎ | Last Update ≎ |
|---|---|---|---|
| mailsv | ⋮ ⌄ | 9,829 | 4/29/14 1:32:47.000 PM |
| vendor_sales | ⋮ ⌄ | 30,244 | 4/29/14 1:32:46.000 PM |
| www1 | ⋮ ⌄ | 24,221 | 4/29/14 1:32:44.000 PM |
| www2 | ⋮ ⌄ | 22,595 | 4/29/14 1:32:47.000 PM |
| www3 | ⋮ ⌄ | 22,975 | 4/29/14 1:32:45.000 PM |

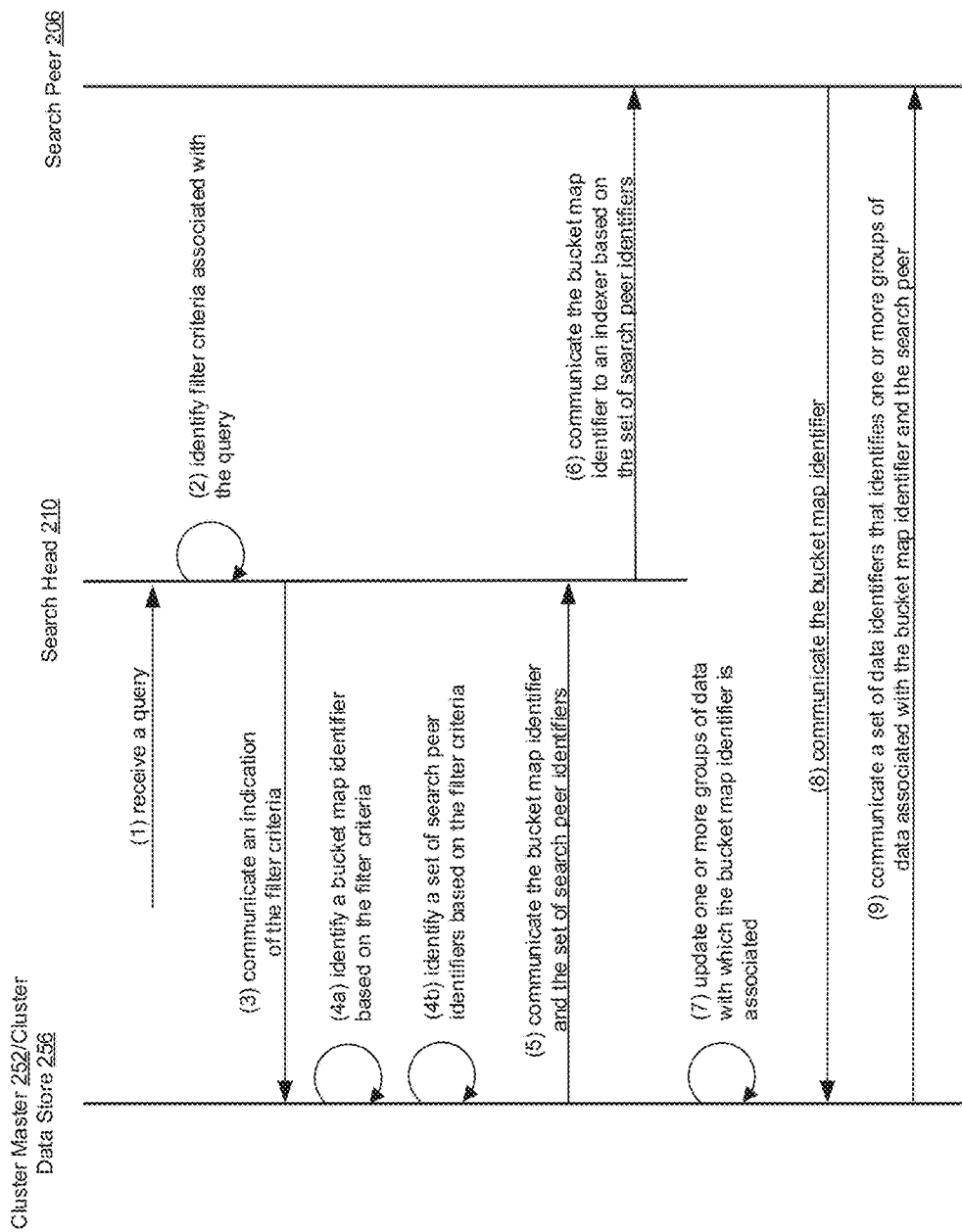

RECOVERING PRE-INDEXED DATA FROM A SHARED STORAGE SYSTEM FOLLOWING A FAILED INDEXER

RELATED APPLICATIONS

Any and all applications for which a foreign or domestic priority claim is identified in the Application Data Sheet as filed with the present application are incorporated by reference under 37 CFR 1.57 and made a part of this specification. This application is being filed on Jan. 31, 2020 concurrently with the following U.S. Patent Applications, each of which is incorporated by reference herein in its entirety:

| Attorney Docket No. | Patent Application Title | Filing Date |
|---|---|---|
| 16/778,427 | MAPPING BUCKETS AND SEARCH PEERS TO A BUCKET MAP IDENTIFIER FOR SEARCHING | Jan. 31, 2020 |
| 16/778,498 | SEARCH RECOVERY USING A SHARED STORAGE SYSTEM FOLLOWING A FAILED SEARCH PEER | Jan. 31, 2020 |

BRIEF DESCRIPTION OF THE DRAWINGS

The present disclosure is illustrated by way of example, and not limitation, in the figures of the accompanying drawings, in which like reference numerals indicate similar elements and in which:

FIG. 4 is a block diagram of an example data intake and query system that performs searches across external data systems, in accordance with example embodiments;

FIG. 5C provides a visual representation of the manner in which a pipelined search language or query operates, in accordance with example embodiments;

FIG. 7C illustrates an example of creating and using an inverted index, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9, 10, 11A, 11B, 11C, 11D, 12, 13, 14, and 15 are interface diagrams of example report generation user interfaces, in accordance with example embodiments;

FIG. 17B is an interface diagram of an example user interface of an incident review dashboard, in accordance with example embodiments;

FIG. 19A is a data flow diagram illustrating an embodiment of data flow and communications illustrating an example method for identifying data to be searched using a bucket map identifier;

DETAILED DESCRIPTION

Figure 1:
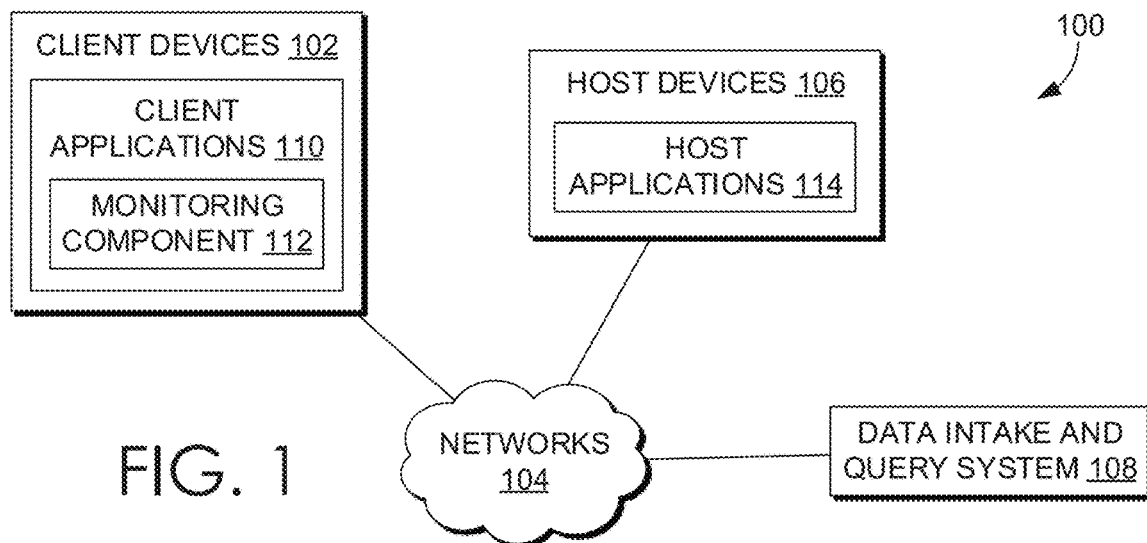
FIG. 1 is a block diagram of an example networked computer environment, in accordance with example embodiments.

Embodiments are described herein according to the following outline:

1.0. General Overview
2.0. Operating Environment
  2.1. Host Devices
  2.2. Client Devices
  2.3. Client Device Applications
  2.4. Data Server System
    2.4.1. Cluster Master
    2.4.2. Cluster Data Store 2.5 Cloud-Based System Overview
2.6 Searching Externally-Archived Data
   2.6.1. ERP Process Features
2.7. Data Ingestion
   2.7.1. Input
   2.7.2. Parsing
   2.7.3. Indexing
2.8. Query Processing
2.9. Pipelined Search Language
2.10. Field Extraction
2.11. Example Search Screen
2.12. Data Modeling
2.13. Acceleration Techniques
   2.13.1. Aggregation Technique
   2.13.2. Keyword Index
   2.13.3. High Performance Analytics Store
      2.13.3.1 Extracting Event Data Using Posting Values
   2.13.4. Accelerating Report Generation
2.14. Security Features
2.15. Data Center Monitoring
2.16. IT Service Monitoring
2.17. Recovering Pre-Indexed Data Following a Failed Indexer
2.18. Mapping Groups of Data and Indexers to a Bucket Map Identifier for Searching
2.19. Search Recovery Using a Shared Storage System Following a Failed Search Peer
4.0. Terminology

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters forms a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2A:
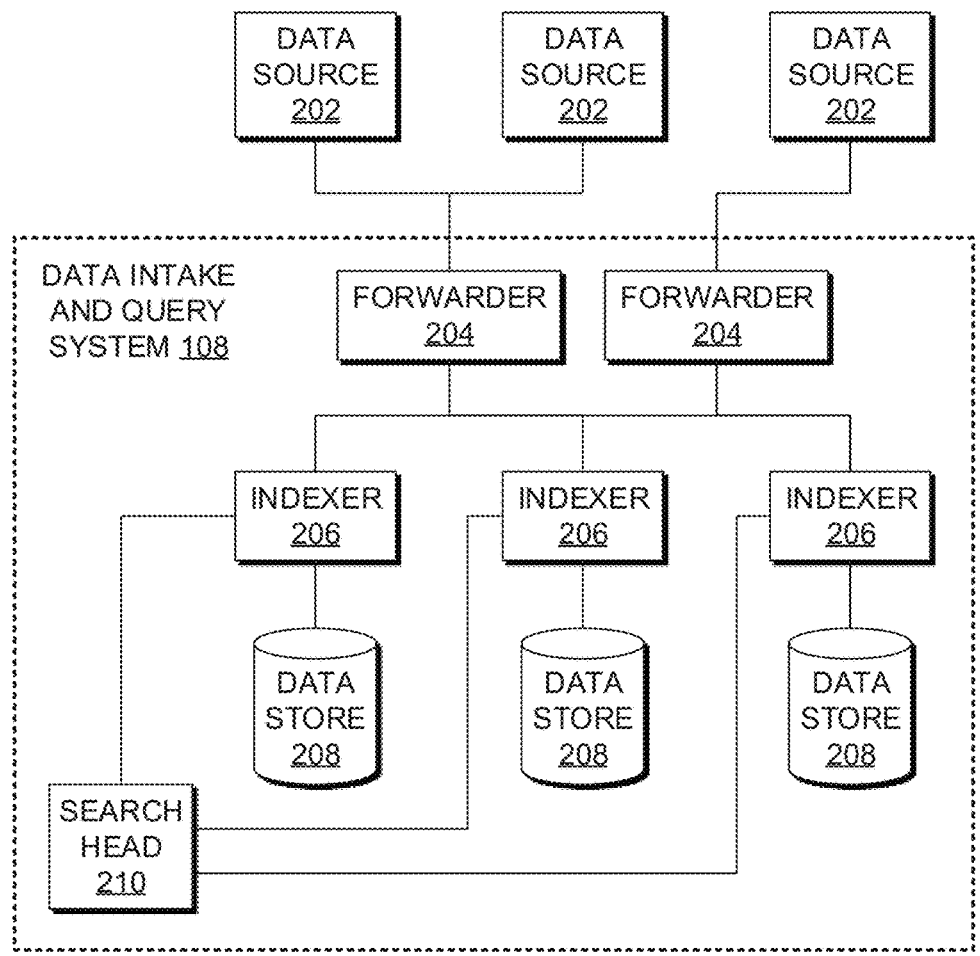
FIG. 2A is a block diagram of an example data intake and query system, in accordance with example embodiments.

FIG. 2A is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 206 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

Figure 2B:
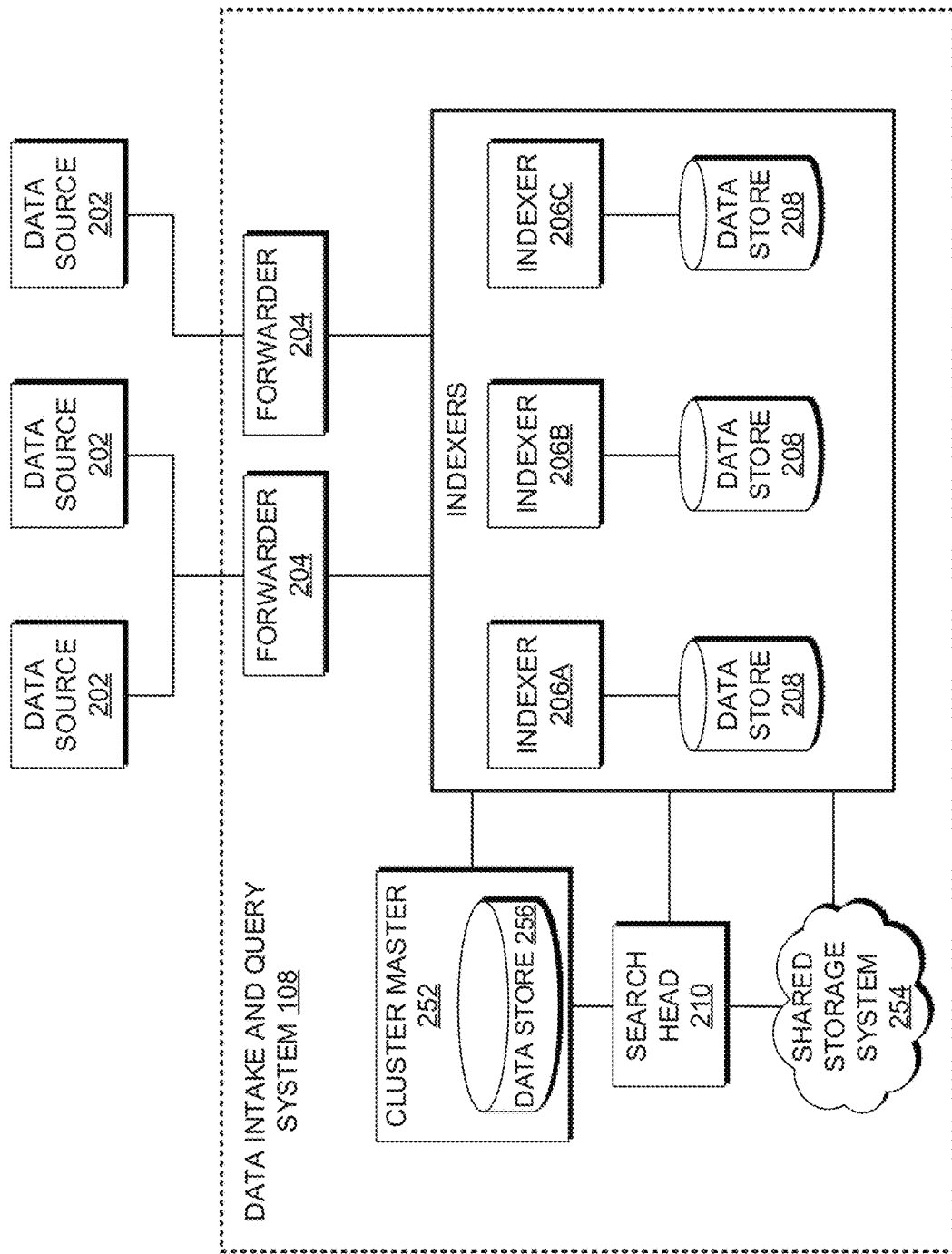
FIG. 2B is a block diagram of an example data intake and query system, in accordance with example embodiments.

FIG. 2B is a block diagram of an embodiment of the data intake and query system 108. In the illustrated embodiment, the data intake and query system 108 can include one or more forwarders 204 that receive data from one or more data sources 202, a search head 210, indexers 206, a cluster master 252, and a shared storage system 254. The data sources 202, forwarders 204, indexers 206, and search head 210 in the illustrated embodiment of FIG. 2B can correspond to the data sources 202, forwarders 204, indexers 206, and search head 210 described herein at least with reference to FIG. 2A.

Although FIG. 2B illustrates some example communication pathways between various components of the data intake and query system 108, it will be understood that the components can be configured to communicate in a variety of ways. For example, any component may be configured to communicate with any other component (e.g., the cluster master 252 can communicate with the shared storage system 254 or forwarders 204, etc.). As another example, certain components may be limited in their communications with other components. For example, the cluster master 252 may not be communicatively coupled with the shared storage system 254.

The shared storage system 254 can correspond to cloud storage, such as Amazon Simple Storage Service (S3) or Elastic Block Storage (EBS), Google Cloud Storage, Microsoft Azure Storage, etc. The shared storage system 254 can be made up of one or more data stores storing data that has been received from one or more data sources 202 and/or processed by the indexers 206. The shared storage system 254 can be configured to provide high availability, highly resilient, low loss data storage. In some cases, to provide the high availability, highly resilient, low loss data storage, the shared storage system 254 can store multiple copies of the data in the same and different geographic locations and across different types of data stores (e.g., solid state, hard drive, tape, etc.). Further, as data is received at the shared storage system 254 it can be automatically replicated multiple times according to a replication factor to different data stores across the same and/or different geographic locations.

Although only three indexers 206A, 206B, 206C (a first indexer 206A, a second indexer 206B, and a third indexer 206C, individually or collectively referred to as indexer 206 or indexer(s) 206) and three data stores 208 are illustrated, it will be understood that the system 108 can include fewer or additional indexers 206 and/or data stores 208.

As described herein, an indexer 206 can be the primary indexing execution engine, and can be implemented as a distinct computing device. For example, the indexer(s) 206 can be tasked with parsing, processing, indexing, and/or storing the data received from the forwarder(s) 204. Specifically, in some embodiments, the indexer 206 can parse the incoming data to identify timestamps, generate events from the incoming data, group and save events into buckets, generate summaries or indexes (e.g., time series index, inverted index, keyword index, etc.) of the events in the buckets, and store the buckets locally (for example, in the data store 208) and/or in shared storage system 216. In addition, as described herein, the indexers 206 can be used to search data. In embodiments where indexers 206 search data, they (or the component that does search data) may be referred to as "search peers" or "search nodes." Accordingly, reference to a search peer or search node can refer to an indexer 206 or other component or computing device configured to perform one or more search-related tasks.

As described herein, the buckets that are being edited by an indexer 206 can be referred to as hot buckets or editable buckets. For example, an indexer 206 can add data, events, and indexes to editable buckets in the data store 208, etc. Buckets in the data store 208 that are no longer edited by an indexer 206 can be referred to as warm buckets or non-editable buckets.

As described herein, in some cases, the indexers 206 can store a copy of data that it is processing (e.g., slices of data corresponding to a hot bucket) and/or a copy of the results of processing/indexing the data (e.g., warm buckets) in the shared storage system 254. As described herein, the cluster master 252 can track the copies of the data stored in the shared storage system 254. In the event a first indexer 206 fails during indexing or search, the cluster master 252 can assign a second indexer 206 to index or search the data that had been assigned to the first indexer 206 for indexing and/or searching, respectively. In this way, the cluster master 252 and shared storage system 254 can improve the data availability and resiliency of the data intake and query system 108

In some embodiments, once the slices of data or warm buckets are copied to the shared storage system 254, an indexer 206 can notify the cluster master 252 that the data associated with the hot or warm bucket has been stored. In addition, the indexer 206 can provide the cluster master 252 with information about the buckets stored in the shared storage system 254, such as, but not limited to, location information, index identifier, time range, etc. As described herein, the cluster master 252 can use this information to update the cluster data store 256. In certain embodiments, the indexer 206 can update the cluster data store 256. For example, the indexer 206 can update the cluster data store 256 based on the information it receives from the shared storage system 254 about the stored buckets.

In some embodiments, some or all of the shared storage system 254, the search head 210, the indexers 206, the cluster master 252, and/or the cluster data store may be communicatively coupled. For example, any of the indexers 206 may be configured to individually communicate with any of the shared storage system 254, the search head 210, the cluster master 252, and/or the cluster data store.

2.4.1. Cluster Master

The cluster master 252 can be used to track processing, storage, and searching assignments within the data intake and query system 108. In the event of a failed indexer 206, the cluster master 252 can be used to reassign tasks within the data intake and query system.

In some cases, the cluster master 252 can maintain the cluster data store 256 with information identifying groups of data (e.g., slices of data, hot buckets, warm buckets, etc.), the location of the groups of data, as well as an identification of the indexers assigned to process, store, and/or search the groups of data. Accordingly, the cluster master 252 can be communicatively coupled to one or more components of the data intake and query system 108, such as any combination of one or more of the indexers 206, the search head 210, the shared storage system 254, and/or the cluster data store 256. The cluster master 252 can monitor indexers 206, determine data-indexer 206 assignment (e.g., which indexers 206 are to process or search which data), update data-indexer assignments, receive filter criteria associated with queries, identify bucket map identifiers (described below), receive requests for and communicate bucket map identifiers, identify and communicate data identifiers associated with bucket map identifiers, etc.

As mentioned, the cluster master 252 can maintain the cluster data store 256. For example, the cluster master 252 can communicate with or monitor the indexers 206 to determine, identify, or update information, such as indexer (or search peer) identifiers, data identifiers (e.g., bucket or slice identifiers), location information, metrics, status identifiers, indexer assignments, or bucket map identifiers that can be used to aid in the processing, storage, or search of data. As another example, the cluster master 252 can communicate with or monitor the search head 210 to determine, identify, or update information, such as filter criteria, indexer identifiers, or bucket map identifiers to aid in the search of data. The cluster master 252 can populate the cluster data store 256 and/or update it over time with the data that it determines from the indexers 206 and/or search head 210. For example, as information changes, the cluster master 252 can update the cluster data store 256. In this way, the cluster data store 256 can retain an up-to-date database of data-indexer information.

In some cases, the cluster master 252 can maintain the cluster data store 256 by pinging the indexers 206 for information or passively receiving it based on the indexers 206 independently reporting the information. For instance, the cluster master 252 can ping or receive information from the indexers 206 at predetermined intervals of time, such as every X number of seconds, or every X minute(s), etc. In addition or alternatively, the indexers 206 can be configured to automatically send their data to the cluster master 252 and/or the cluster master 252 can ping a particular indexer 206 after the passage of a predetermined period of time (for example, every X number of seconds or every X minutes) since the cluster master 252 requested and/or received data from that particular indexer 206.

In some cases, the cluster master 252 can maintain the cluster data store 256 by receiving status update communications from the indexers 206. Status update communications or "heartbeats" can occur periodically or according to a schedule, policy, or algorithm. For example, a time-based schedule may be used so that heartbeats may be performed every X number of seconds, or every X minute(s), and so forth. In some cases, the cluster master 252 can determine that an indexer 206 is unavailable, failing, or that an indexer did not process assigned data based on the status update communications or absence of status update communications from the indexer 206, and can update the cluster data store 256 accordingly.

2.4.2. Cluster Data Store

The cluster data store 256 can store information relating to groups of data that are stored and/or processed by the data intake and query system 108. In some embodiments, this information can include bucket map identifiers, indexer identifiers, metrics, status identifiers, or indexer assignments. The cluster data store 256 can be maintained (for example, populated, updated, etc.) by the cluster master 252. As mentioned, in some embodiments, the cluster master 252 and cluster data store 256 can be separate or independent of the indexers 206. Furthermore, in some cases, the cluster data store 256 can be separate from or included in, or part of, the cluster master 252.

As described herein, a bucket map identifier can be associated with filter criteria, groups of data that satisfy the filter criteria, and/or indexers 206 assigned to process and/or search the identified groups of data. In some cases, the cluster data store 256 can store one or more bucket map identifiers. In some embodiments, the bucket map identifiers can be implemented as alphanumeric identifiers or other identifiers that can be used to uniquely identify one bucket map identifier from another bucket map identifier stored in the cluster data store 256.

In some cases, each bucket map identifier can identify, filter criteria, groups of data that satisfy the filter criteria, and/or indexers 206 assigned to process and/or search the identified groups of data. The filter criteria can include one or more criterion used to filter data as part of a search or to otherwise identify groups of data. For example, the filter criteria can include an index identifier and/or time range. In certain embodiments, the filter criteria can include, one or more field-value pairs, metadata (e.g., host, source, sourcetype), or other criterion that can be used to filter data as part of a search.

In addition, each bucket map identifier can be associated with one or more groups of data. A group of data can include pre- and/or post processed data. In some cases, a group of data can correspond to one or more hot buckets and/or warm buckets. In some cases, a group of data can include a set of one or more slices of data before it is processed by an indexer 206 (e.g., slices of a hot bucket). In some cases, a group of data can include a bucket or the content of a bucket, such as one or more files that include a group of events generated from one or more slices of data, an inverted index corresponding to the events, etc. In certain embodiments, the bucket map identifier can be associated to the groups of data using one or more data identifiers. For example, the cluster master 252 can associate one or more data identifiers corresponding to the groups of data with a particular bucket map identifier.

A non-limiting example of a data structure for storing the bucket map identifier is illustrated in Table 1.

TABLE 1

| Bucket Map Identifier | Filter Criteria | Data Identifiers | Indexer ID |
|---|---|---|---|
| 65 | Index: main<br>Time Range:<br>ET: 2020-01-01 00:00:00<br>LT: 2020-01-02 00:00:00 | B56, B67,<br>B89, B92,<br>Slice4 | A423, L526, B603 |

In the illustrated embodiment, the bucket map identifier 65 is associated with filter criteria that includes an index identifier "main," and a time range from "2020-01-01 00:00:00" to "2020-01-02 00:00:00," data identifiers B1, B6, B8, Slice4, and indexer or search peer identifiers A423, L526, B603. Based on the above example, the groups of data associated with the data identifiers B56, B67, B89, B92, and Slice4 are part of the index "main," are at least partially within the time range from "2020-01-01 00:00:00" to "2020-01-02 00:00:00," and can be accessed using indexers/search peers A423, L526, B603. It will be understood that the bucket map identifier entries can be configured in a variety of ways. It will be understood that the bucket map identifier data structure can include fewer or more information. For example, additional filter criteria can be included or indexer identifiers may be omitted, etc. In some cases, a bucket map identifier may include an identification of the specific indexer that is to search a particular group of data. With reference to the example in Table 1, the bucket map identifier entry may indicate that the data associated data identifier B56 and B67 is to be searched by indexer A423, the data associated with data identifiers B89 is to be searched by the indexer L526, and/or the data associated data identifiers B92 and Slice4 is to be searched by indexer B603, etc. In certain embodiments, the bucket map identifier may not include reference to or be associated with unprocessed/unindexed or partially processed/indexed data, such as hot buckets or slices of data (e.g., Slice4), and/or may only include references to data that has been indexed/processed, such as warm buckets.

In some cases, the bucket map identifiers may not be directly associated with indexer identifiers (e.g., the bucket map identifier data structure shown in Table 1 may not include indexer identifiers). In some such embodiments a separate data structure may associate individual data identifiers with indexer identifiers. For example, Table 2 illustrates an example data indexer assignment data structure.

TABLE 2

| Indexer ID | Data Identifiers |
|---|---|
| A423 | B2, B6, B8, B50, B51, B54, B56, B59, B63, B66, B67, Slice1, Slice3, Slice20 |
| L526 | B3, B5, B9, B40, B42, B43, B44, B48, B70, B73, B89, Slice2, Slice10 |
| B603 | Bl, B7, B10, B13, B15, B18, B75, B90, B92, Slice4, Slice5, Slice7, Slice8, Slice9 |

In the illustrated embodiment, the indexer identifier "A423" is associated with the data identifiers B2, B6, B8, B50, B51, B54, B56, B59, B63, B66, B67 corresponding to eleven buckets and data identifiers Slice1, Slice3, Slice20 corresponding to three slices of data, the indexer identifier "L526" is associated with the data identifiers B3, B5, B9, B40, B42, B43, B44, B48, B70, B73, B89, corresponding to eleven buckets and data identifiers Slice2, Slice10, Slice4 corresponding to three slices of data, and the indexer identifier "B603" is associated with the data identifiers B1, B7, B10, B13, B15, B18, B75, B90, B92 corresponding to nine buckets and data identifiers Slice5, Slice7, Slice8, Slice9 corresponding to four slices of data. Based on the above example, the indexer A423 is assigned to search buckets of data corresponding to data identifiers B56 and B67, the indexer L526 is assigned to search a bucket of data corresponding to data identifier B89, and the indexer B603 is assigned to search buckets of data corresponding to data identifier B92 and a slice of data corresponding to data identifier Slice4.

As mentioned, in some cases, the cluster data store 256 includes one or more indexer identifiers (also referred to herein as search peer identifiers) corresponding to the indexers 206. In some cases, the cluster data store 256 can include a different indexer identifier for each indexer 206. In some cases, if an indexer 206 becomes unresponsive or unavailable, the cluster master 252 can update the cluster data store 256 to remove an indexer identifier associated with that indexer 206. In this way, the cluster data store 256 can include up-to-date information relating to which indexers 206 are included and/or available. In certain embodiments, such as where an indexer identifier is associated with multiple bucket map identifiers, the cluster master 252 can remove reference to the indexer identifier for each of the bucket map identifiers. In some such cases, the cluster master 252 can replace the removed indexer identifier with another indexer identifier corresponding to an indexer 206 that is assigned to process and/or search the data that had previously been assigned to the now-unavailable indexer 206.

In some cases, the cluster data store 256 includes one or more metrics associated with one or more of the indexers 206. For example, the metrics can include, but are not limited to, one or more performance metrics such as CPU-related performance metrics, memory-related performance metrics, availability performance metrics, or the like. For example, the cluster data store 256 can include information relating to a utilization rate of an indexer 206, such as an indication of which indexers 206, if any, are working at maximum capacity or at a utilization rate that satisfies utilization threshold, such that the indexer 206 should not be used to process additional data for a time. As another example, the cluster data store 256 can include information relating to an availability or responsiveness of an indexer 206, an amount of processing resources in use by an indexer 206, or an amount of memory used by an indexer 206.

In some cases, the cluster data store 256 includes one or more status identifiers associated with one or more of the indexers 206. For example, in some cases, a status identifier associated with one or more of the indexers 206 can include information relating to an availability of an indexer 206. For example, the cluster data store 256 can include an indication of whether an indexer 206 is available or unavailable. In some cases, as described herein, if an indexer 206 becomes unavailable, the cluster master 252 and/or the cluster data store 256 can disassociate that indexer 206 from (and/or can associate an available indexer 206 to) one, some, or all bucket map identifiers, data identifiers, or the like, and can associate an available indexer 206. In this way, any data, processing, or querying that is assigned to an indexer 206 that becomes unavailable can be re-assigned to an available indexer 206.

In some cases, a determination of the availability of an indexer 206 can be based on a status update (or absence of a status update) from the indexer 206. In some instances, an indexer 206 is considered available if it is instantiated or running, provides periodic status updates to the cluster master 252, and/or is responsive communications from the cluster master 252. In some cases, an indexer 206 is considered available if one or more metrics associated with the indexer 206 satisfies a metrics threshold. For example, an indexer 206 can be considered available if a utilization rate of the indexer 206 satisfies a utilization rate threshold. As another example, an indexer 206 can considered available if an amount of memory used by or available to the indexer 206 satisfies a memory threshold (non-limiting example: available memory >10% of total memory, etc.). As another example, an indexer 206 can be considered available if an amount of available processing resources of the indexer 206 satisfies a processing resources threshold (non-limiting example: CPU usage <90% of capacity, etc.). Similarly, in some cases, an indexer 206 can be considered unavailable if one or more, or some or all, metrics associated with the indexer 206 do not satisfy a metrics threshold.

The cluster data store 256 can store information relating to data of the data intake and query system 108. For example, the cluster data store 256 can include information regarding where data is stored (for example, location information) in shared storage system 254, information usable to identify data (for example, data identifiers), etc. As described herein, the cluster data store 256 can also include filter criteria, an identification of which data satisfies the different filter criteria, the storage location of that data, and which indexers 206 are assigned to search that data, etc.

In some cases, the cluster data store 256 includes one or more data identifiers regarding data of the data intake and query system 108. A data identifier can be used to uniquely identify a group of data in the data intake and query system. For example if the group of data corresponds to a bucket, then the data identifier can be a bucket identifier. If the group of data corresponds to a slice of data, then the data identifier can correspond to a slice identifier, etc.

TABLE 3

| Data Identifier | Information | Location in Shared Storage System | Search Peer |
|---|---|---|---|
| B56 | Index. main<br>Time Range:<br>ET: 2020-01-01 00:12:15<br>LT: 2020-01-01 00:15:10 | Address1 | A423 |
| Slice5 | Index: test<br>Time Range:<br>ET: 2020-01-01 05:20:00<br>LT: 2020-01-01 05:20:45 | Address560 | B603 |

Table 3 illustrates an example data structure for a data identifier entry in the cluster data store 256. In the illustrated embodiment, the data identifier "B56" corresponds to a bucket in the index "main" with a time range from "2020-01-01 00:12:15" to "2020-01-01 00:15:10." A copy of the bucket "B56" is stored at location "Address1" in the shared storage system 254, and the search peer "A423" is responsible for searching the bucket. The data identifier "Slice5" corresponds to a slice in the index "test" with a time range from "2020-01-01 05:20:00" to "2020-01-01 05:20:45." Note that the time range of the slice is smaller than a bucket as buckets are typically made up of multiple slices of data. A copy of the slice "Slice5" is stored at location "Address560" in the shared storage system 254, and the search peer "B603" is responsible for searching the slice and processing the slice to form a warm bucket.

Any one or any combination of the data structures shown in Tables 1, 2, and 3 can be used to organize, structure, or search, the data in the cluster data store 256. For example, in some cases, the data structures of Table 1 can be used to identify a bucket map identifier and indexer identifiers for a search head and/or identify data identifiers for specific search peers. Similarly, the data structure of Table 2 can be used to identify data identifiers for specific search peers. The data structure of Table 3 can be used to generate the data structures shown in Tables and 2, etc.

In some cases, the cluster data store 256 includes location information regarding data in the data intake and query system 108. For example, the cluster data store 256 can include location information for some or all of the sets of one or more slices of data (before or after processing), some or all of the buckets, etc. Location information can include a reference to a location at which a group of data is stored. The location information can identify a location in local storage (for example, identifying a particular indexer 206 and/or data store 208) and/or a location in the shared storage system 254.

The cluster master 252 can identify indexers 206 and can maintain indexer identifiers in the cluster data store 256. In addition, the cluster data store 256 can store an indexer assignment listing that associates indexers 206 with data identifiers associated with the groups of data that the indexers 206 is assigned to process/index, store, or search. A non-limiting embodiment of a data structure for storing indexer assignment listings is shown above with reference to Table 2. The cluster master 252 can maintain indexer assignments that identify the indexers 206 that are assigned to process the groups of data. In some cases, the cluster master 252 can determine an indexer assignment based on information received from the indexer 206. For example, the cluster master 252 can create or update an indexer assignment in response to receiving a data identifier 252 from the indexer 206. The cluster master 252 can use the indexer assignments to determine which indexer 206 is assigned to process, store, or search a particular group of data. As a non-limiting example, the indexer assignments can identify that a first indexer is assigned to process a first set of one or more slices of data. However, in response to a determination that the first indexer is unavailable, failing, or otherwise did not process the first set of one or more slices of data, the cluster master 252 can un-assign the first indexer from the first set of one or more slices of data and/or assign a second indexer to process the first set of one or more slices of data, and can update the indexer assignments.

If an indexer 206 later deletes data from its local storage, it can communicate this change to the cluster master 252. The cluster master 252 can update the indexer assignment to indicate that the indexer 206 no longer has the data stored locally. In some such cases, the cluster master 252 can assign an indexer 206 to be responsible for searching the data. For example, the cluster master 252 can assign the same indexer 206 that had the data originally, other indexers 206 that are processing data, or indexers 206 that do not process or store, data but are dedicated to searching data. The cluster master 252 can store the updated assignment in the cluster data store 256.

2.5. Cloud-Based System Overview

The example data intake and query system 108 described in reference to FIGS. 2A and 2B comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
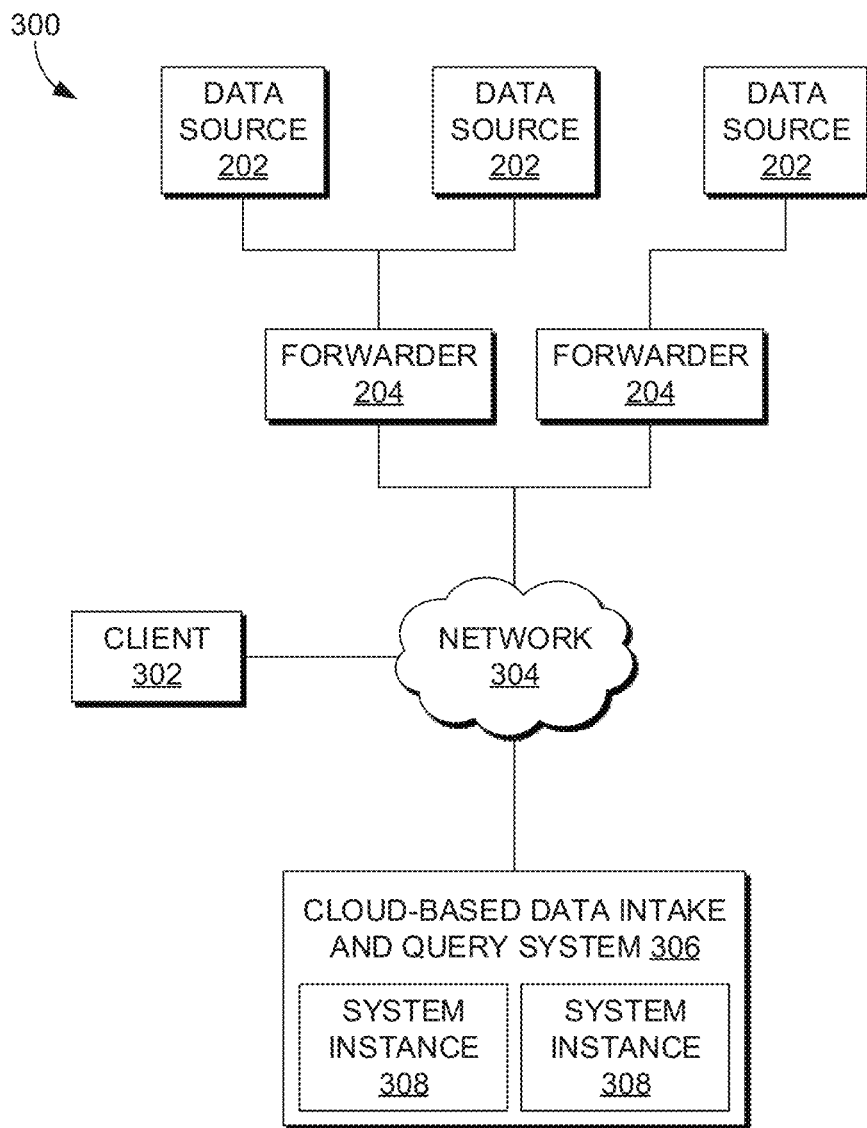
FIG. 3 is a block diagram of an example cloud-based data intake and query system, in accordance with example embodiments.

FIG. 3 illustrates a block diagram of an example cloud-based data intake and query system. Similar to the system of FIGS. 2A and 2B, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b . . . 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
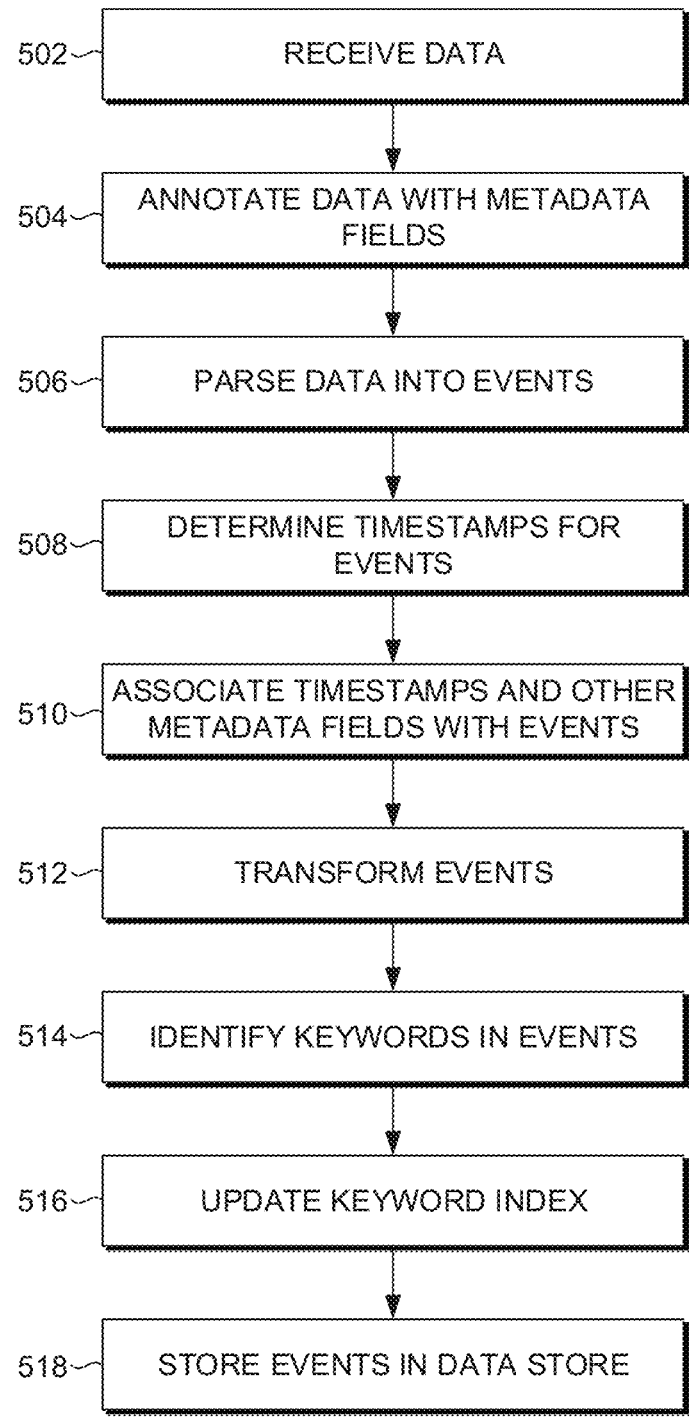
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIGS. 2A and 2B. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-533 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 531-533 in the data store.

Event 534 is associated with an entry in a server error log, as indicated by "error.log" in the source column 537 that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
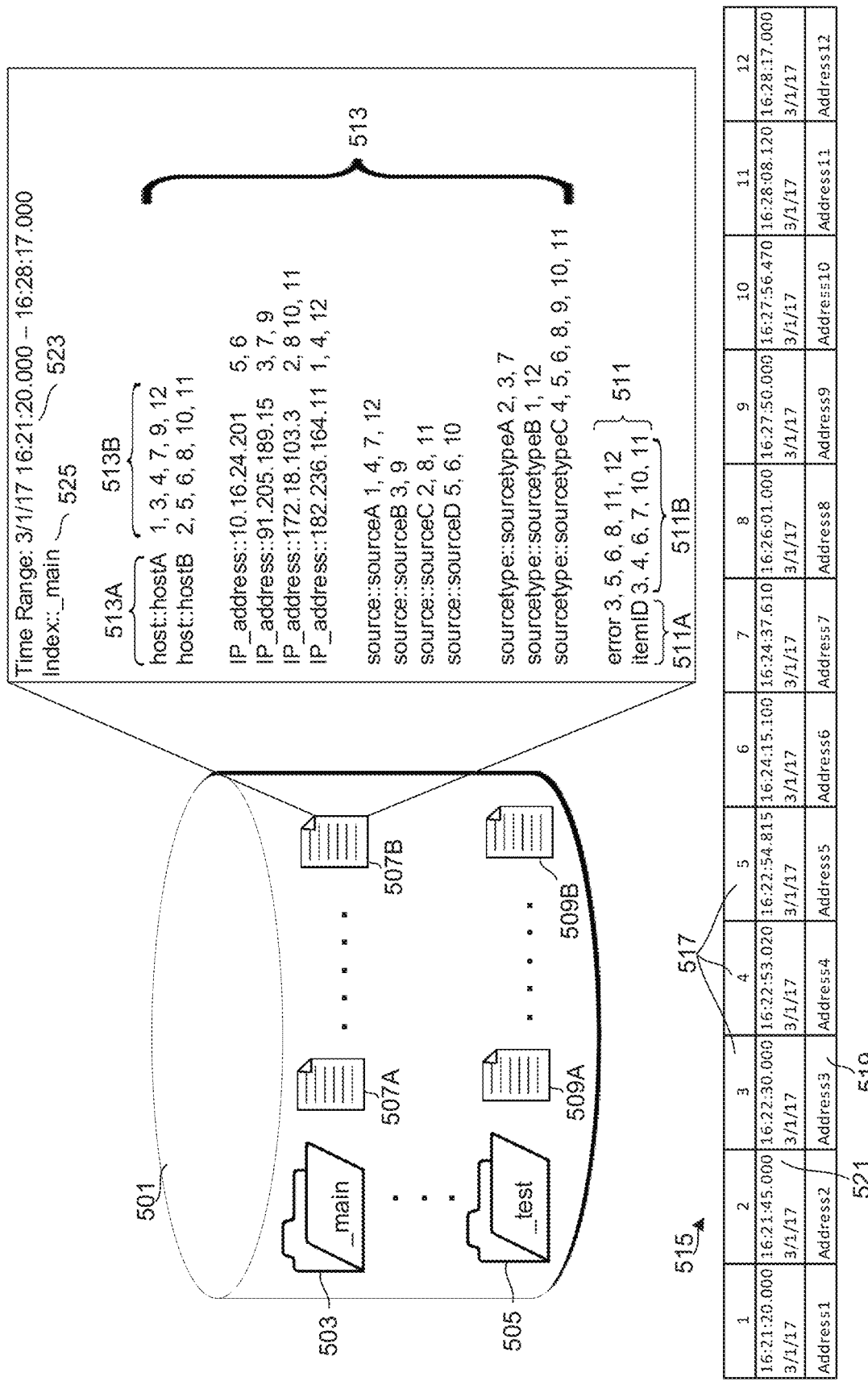
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, and/or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example, if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 515 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16: 28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted index 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21: 20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with a partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 515 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
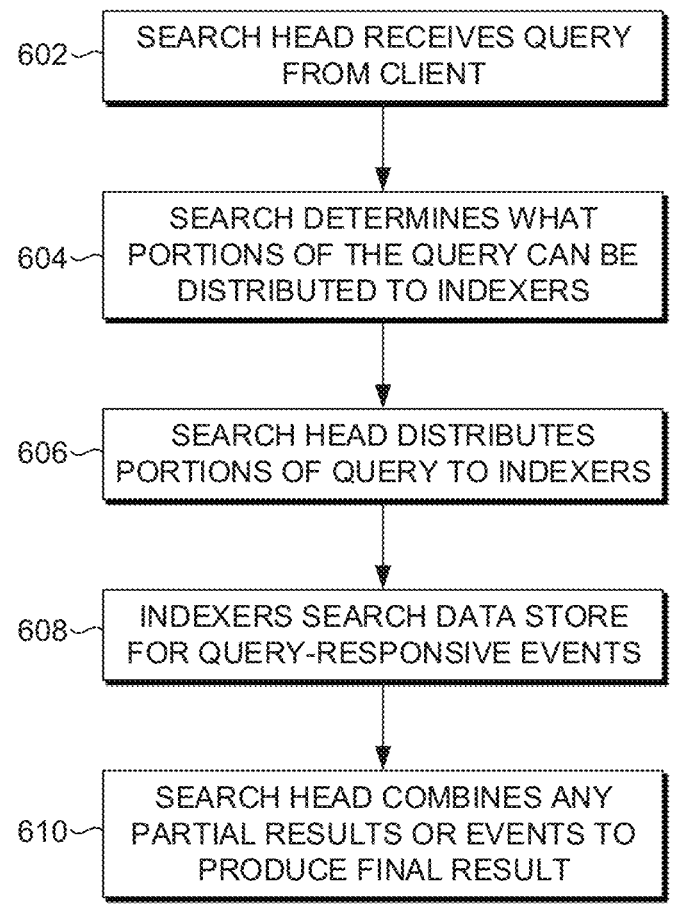
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, shown in FIG. 2B, but not shown in FIG. 2A) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
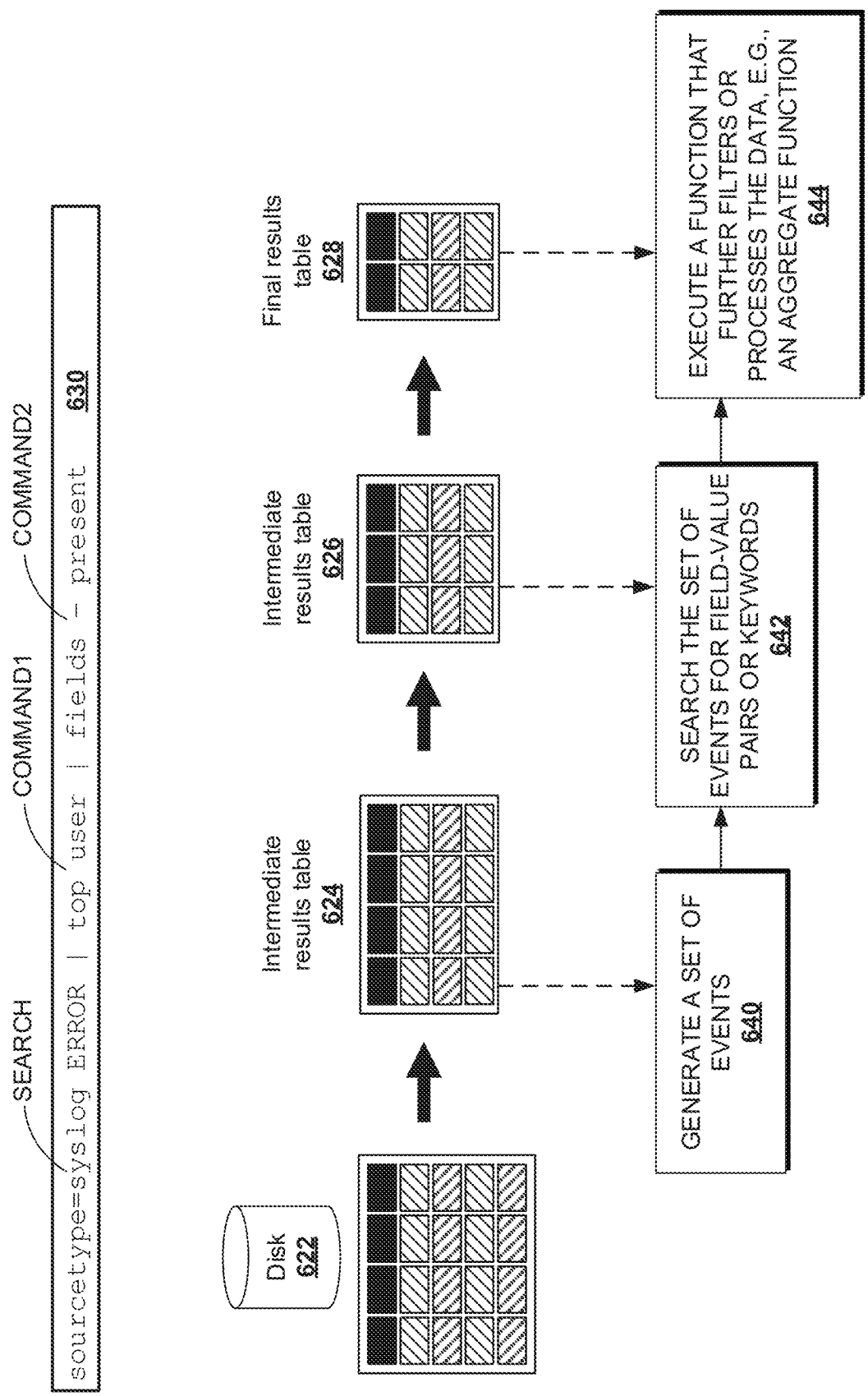
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
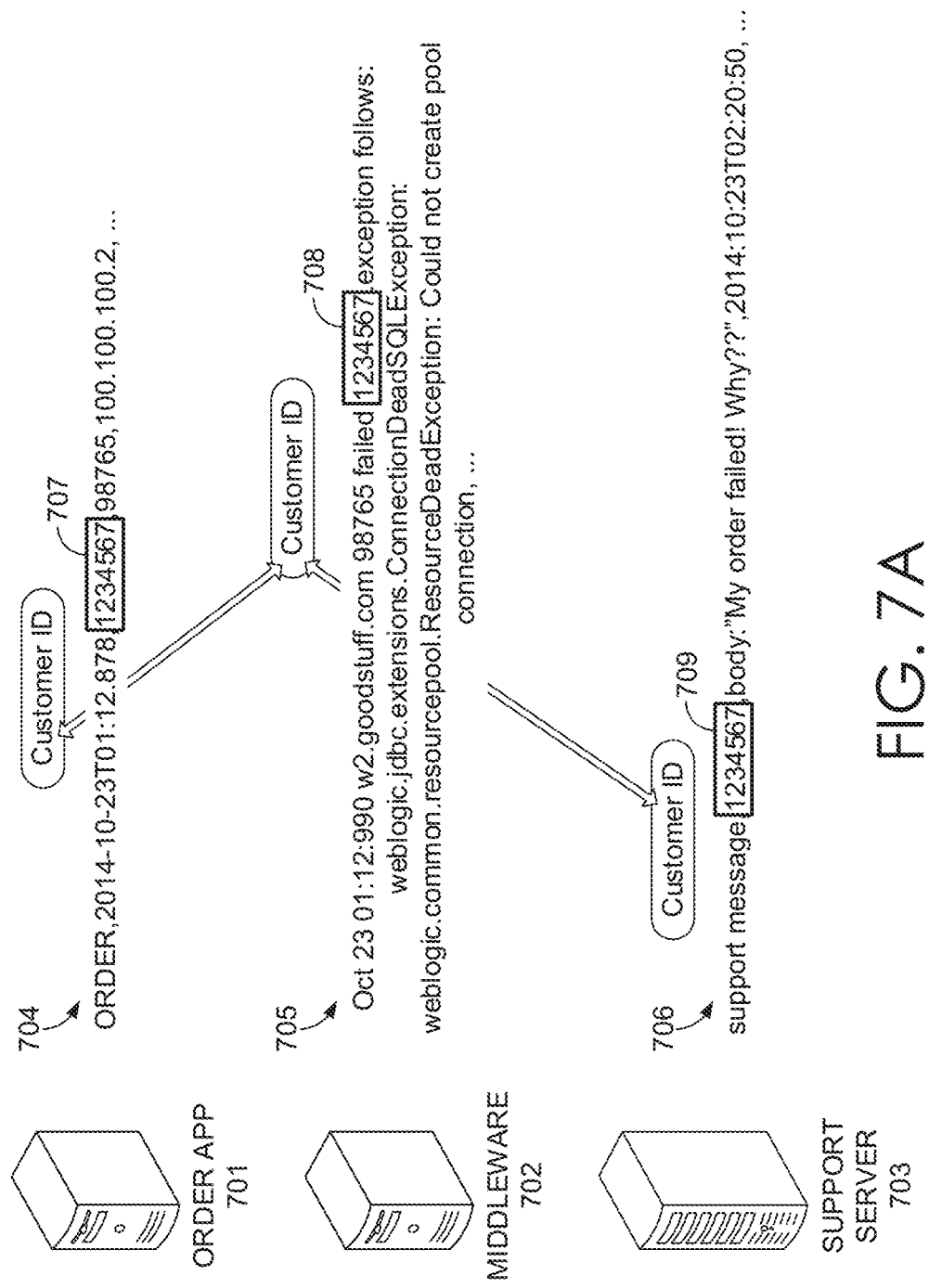
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
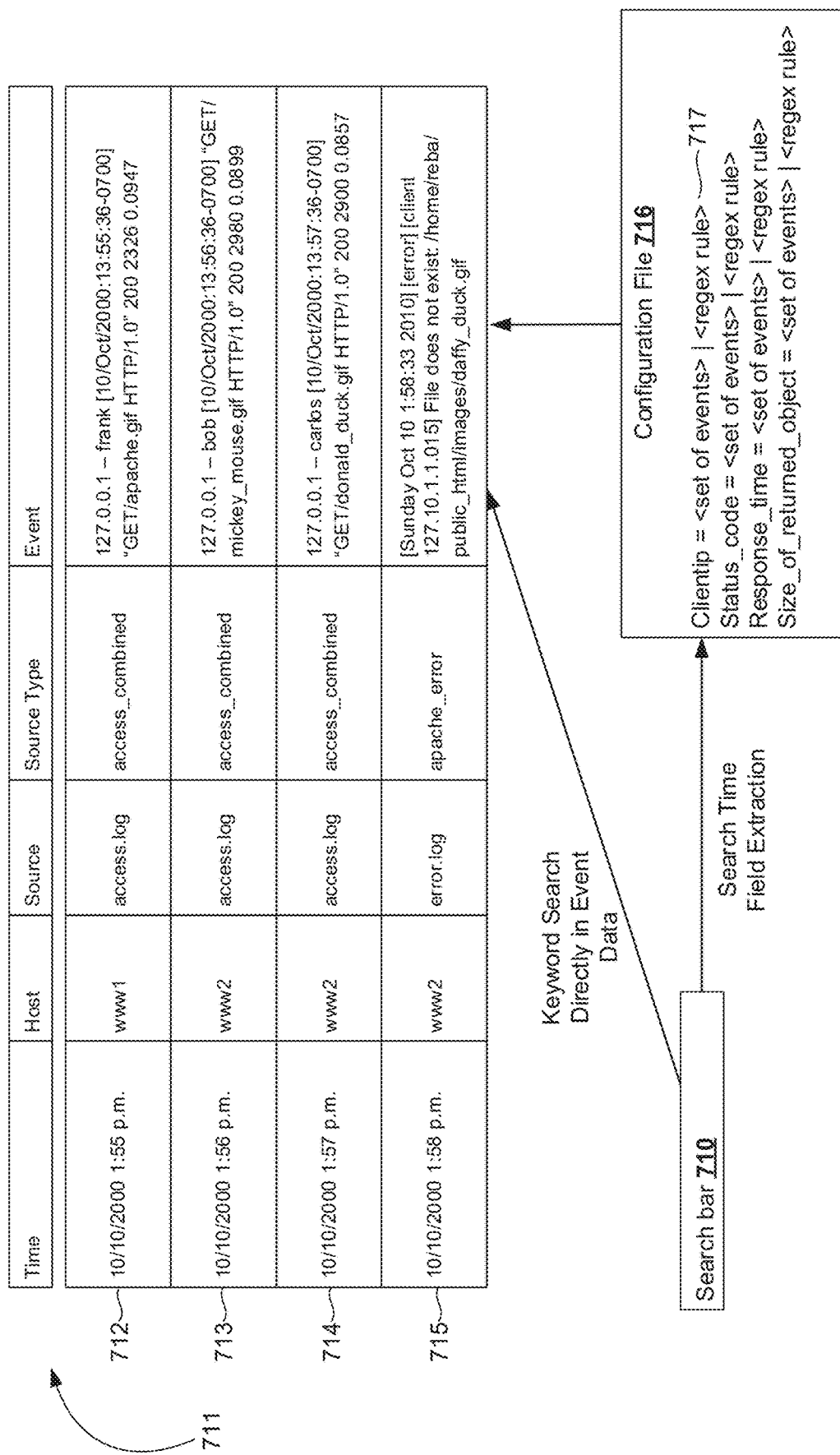
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 710 that includes only keywords (also known as "tokens"), e.g., the keyword "error" or "warning", the query search engine of the data intake and query system searches for those keywords directly in the event data 711 stored in the raw record data store. Note that while FIG. 7B only illustrates four events 712, 713, 714, 715, the raw record data store (corresponding to data store 208 in FIGS. 2A and 2B) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", the events 712, 713, and 714, will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the data intake and query system will search the event data directly and return the first event 712. Note that whether the keyword has been indexed at index time or not, in both cases the raw data of the events 712-715 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 716 during the execution of the search as shown in FIG. 7B.

Configuration file 716 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 716.

In some embodiments, the indexers may automatically discover certain custom fields at index time and the regular expressions for those fields will be automatically generated at index time and stored as part of extraction rules in configuration file 716. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 716 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 716 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 715 also contains "clientip" field, however, the "clientip" field is in a different format from the events 712, 713, and 714. To address the discrepancies in the format and content of the different types of events, the configuration file will also need to specify the set of events that an extraction rule applies to, e.g., extraction rule 717 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 716 and each of the extraction rules would comprise a different regular expression to parse out the associated field value. The most common way to categorize events is by source type because events generated by a particular source can have the same format.

The field extraction rules stored in configuration file 716 perform search-time field extractions. For example, for a query that requests a list of events with source type "access_combined" where the "clientip" field equals "127.0.0.1,"

the query search engine would first locate the configuration file 716 to retrieve extraction rule 717 that would allow it to extract values associated with the "clientip" field from the event data 720 "where the source type is "access_combined." After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, the events 712, 713, and 714 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 716 allows the record data store to be field searchable. In other words, the raw record data store can be searched using keywords as well as fields, wherein the fields are searchable name/value pairings that distinguish one event from another and can be defined in configuration file 716 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
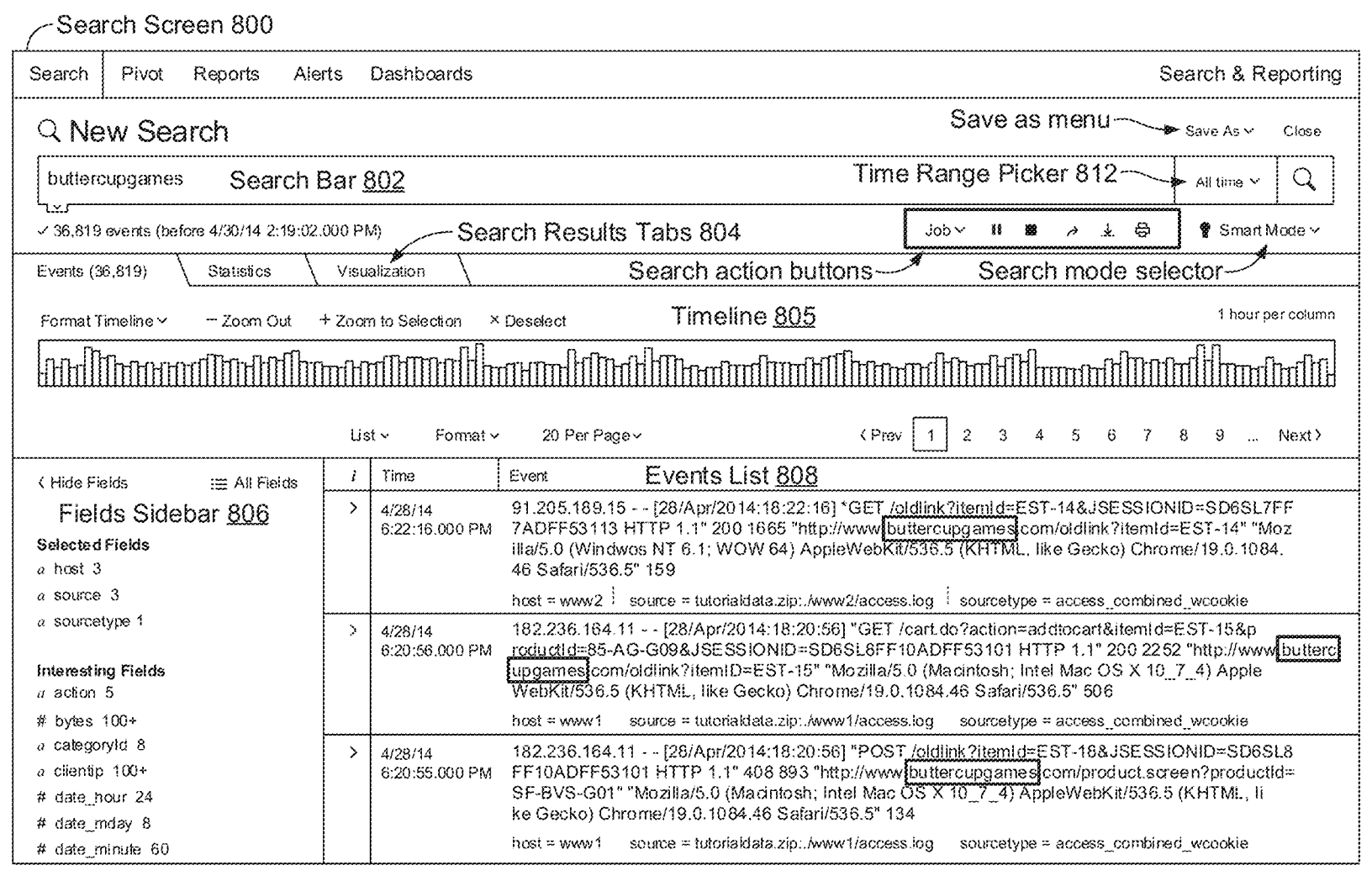

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
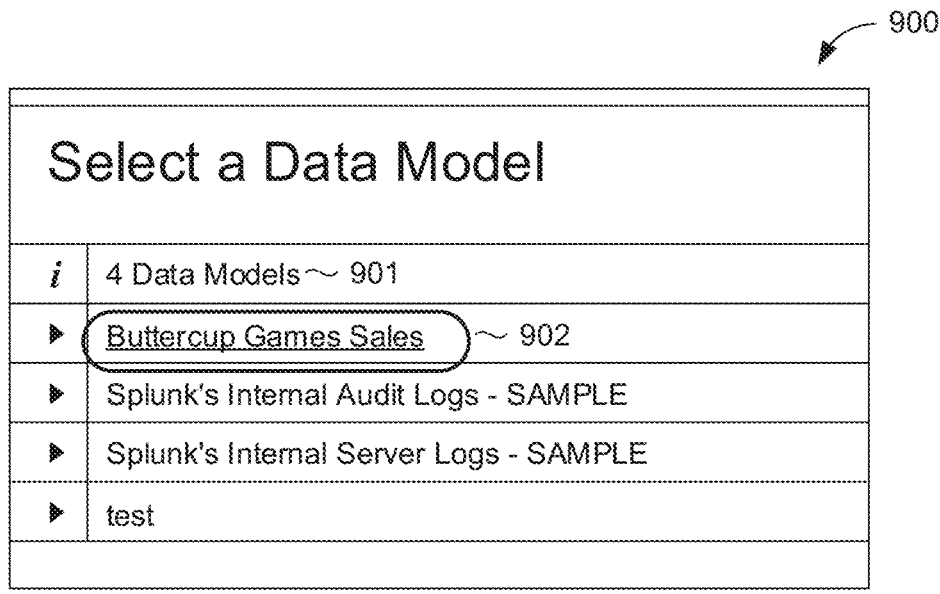

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
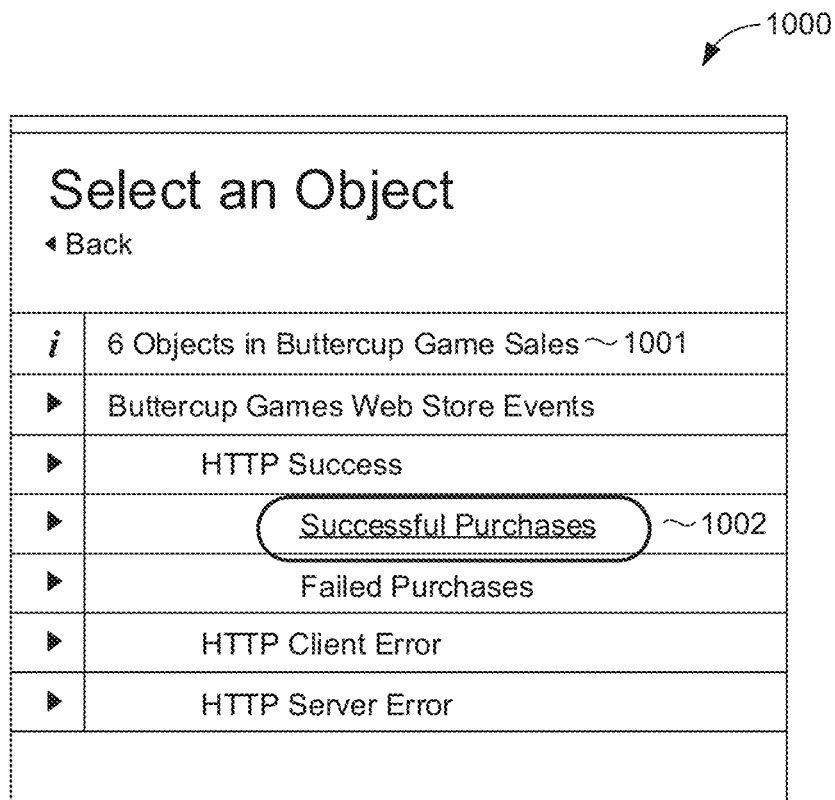

FIG. 10 illustrates an example data model object selection graphical user interface 1000 that displays available data objects 1001 for the selected data object model 902. The user may select one of the displayed data model objects 1002 for use in driving the report generation process.

Figure 11A:
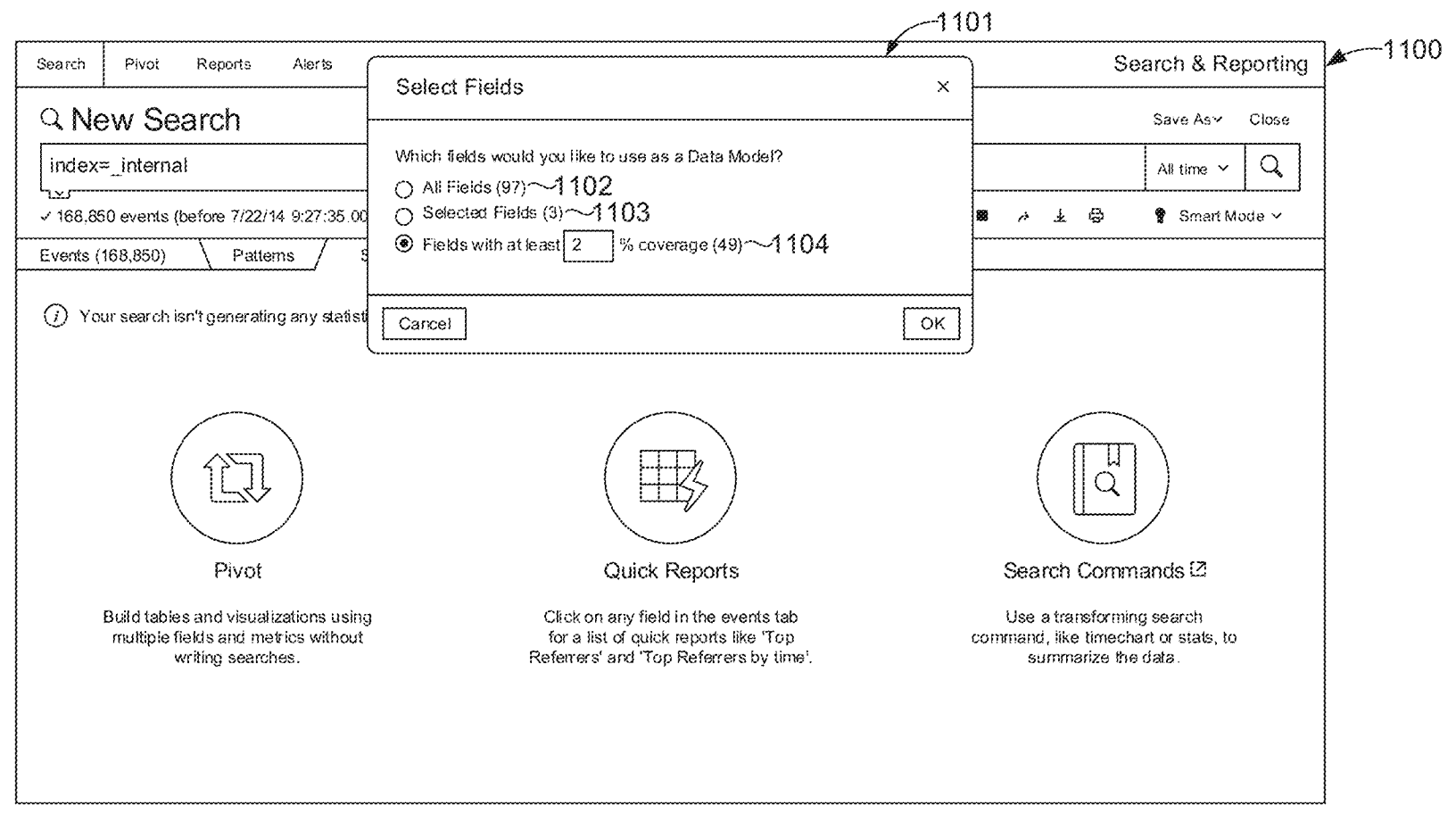

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
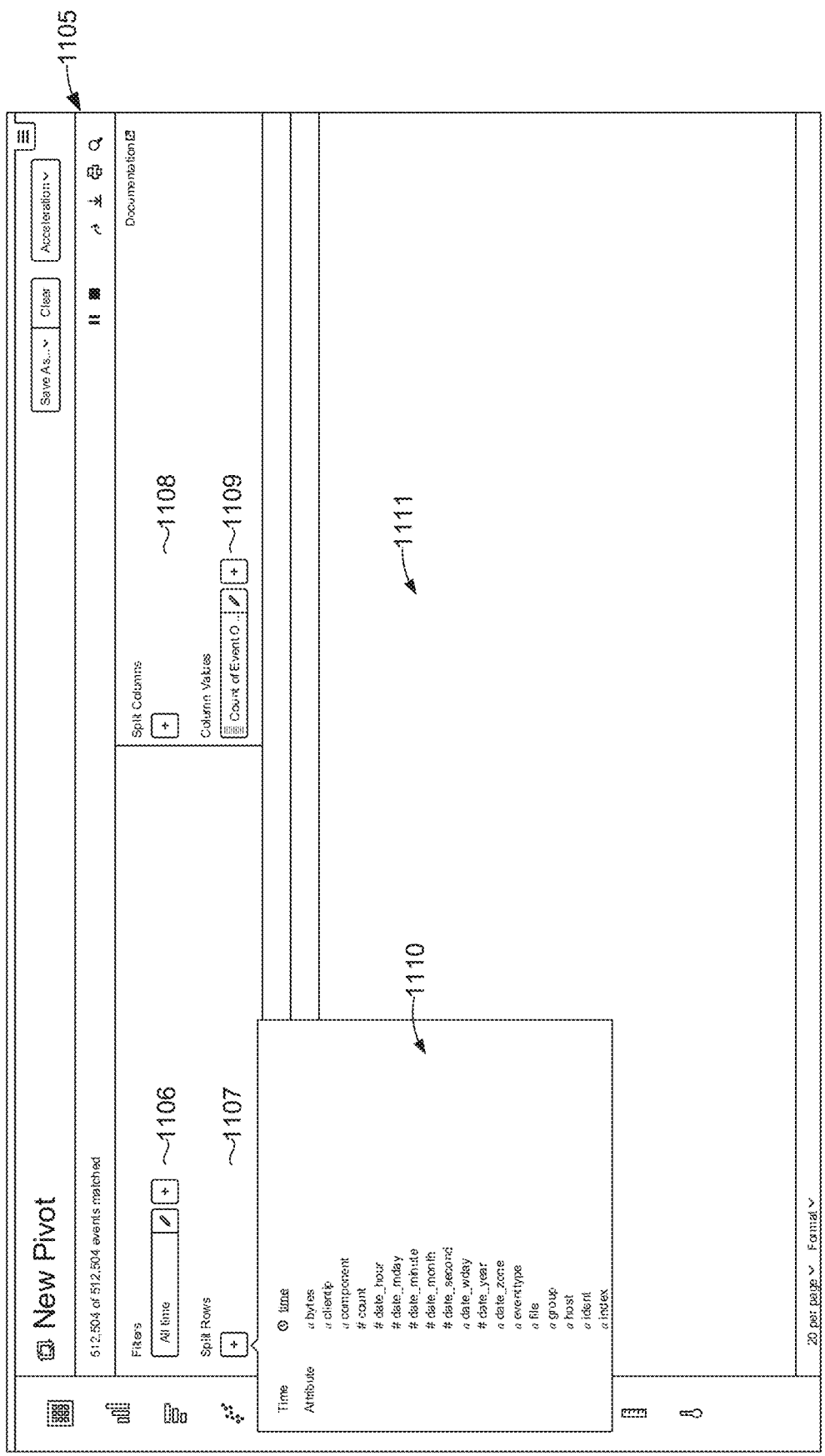
Figure 11C:
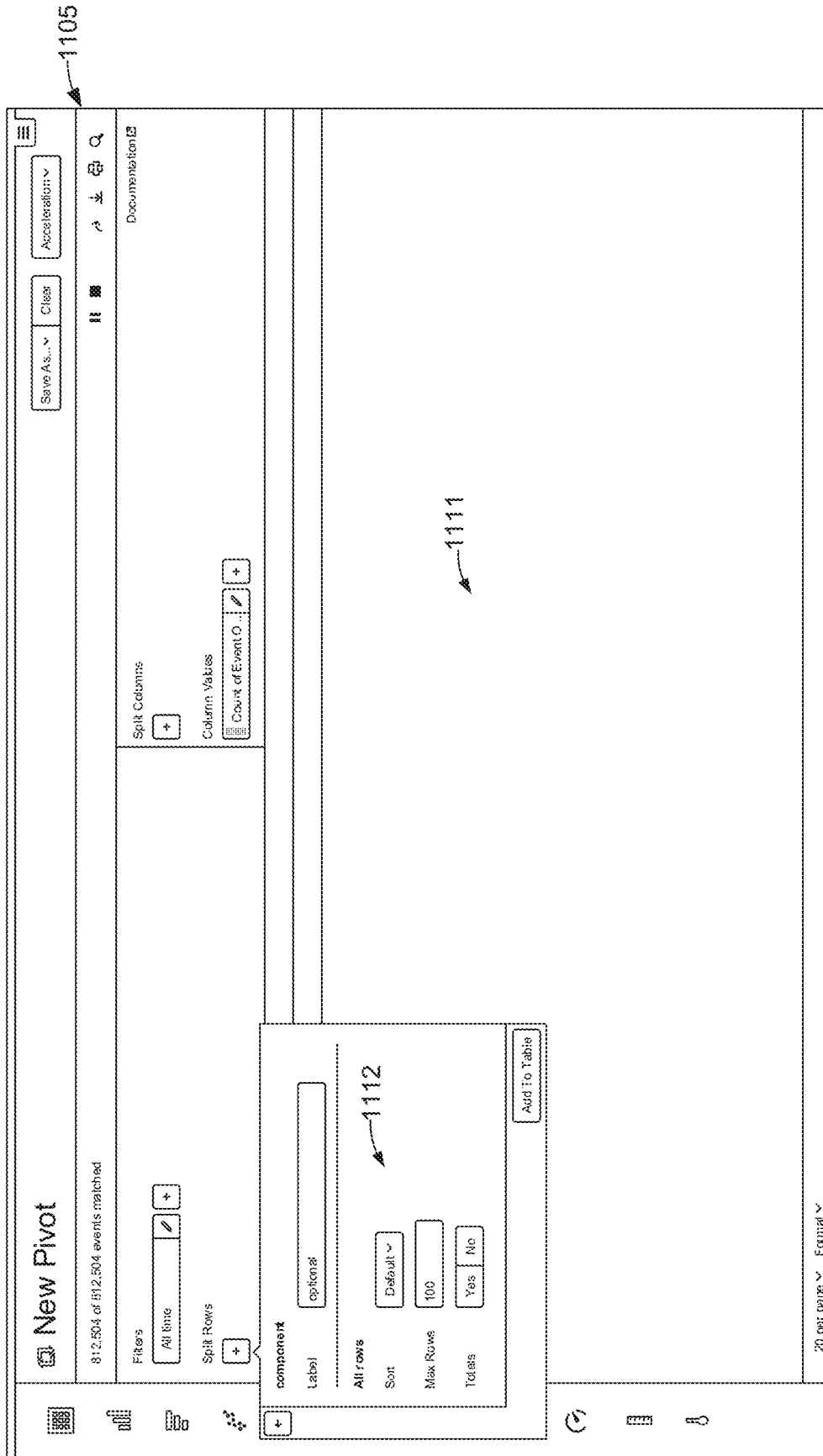

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
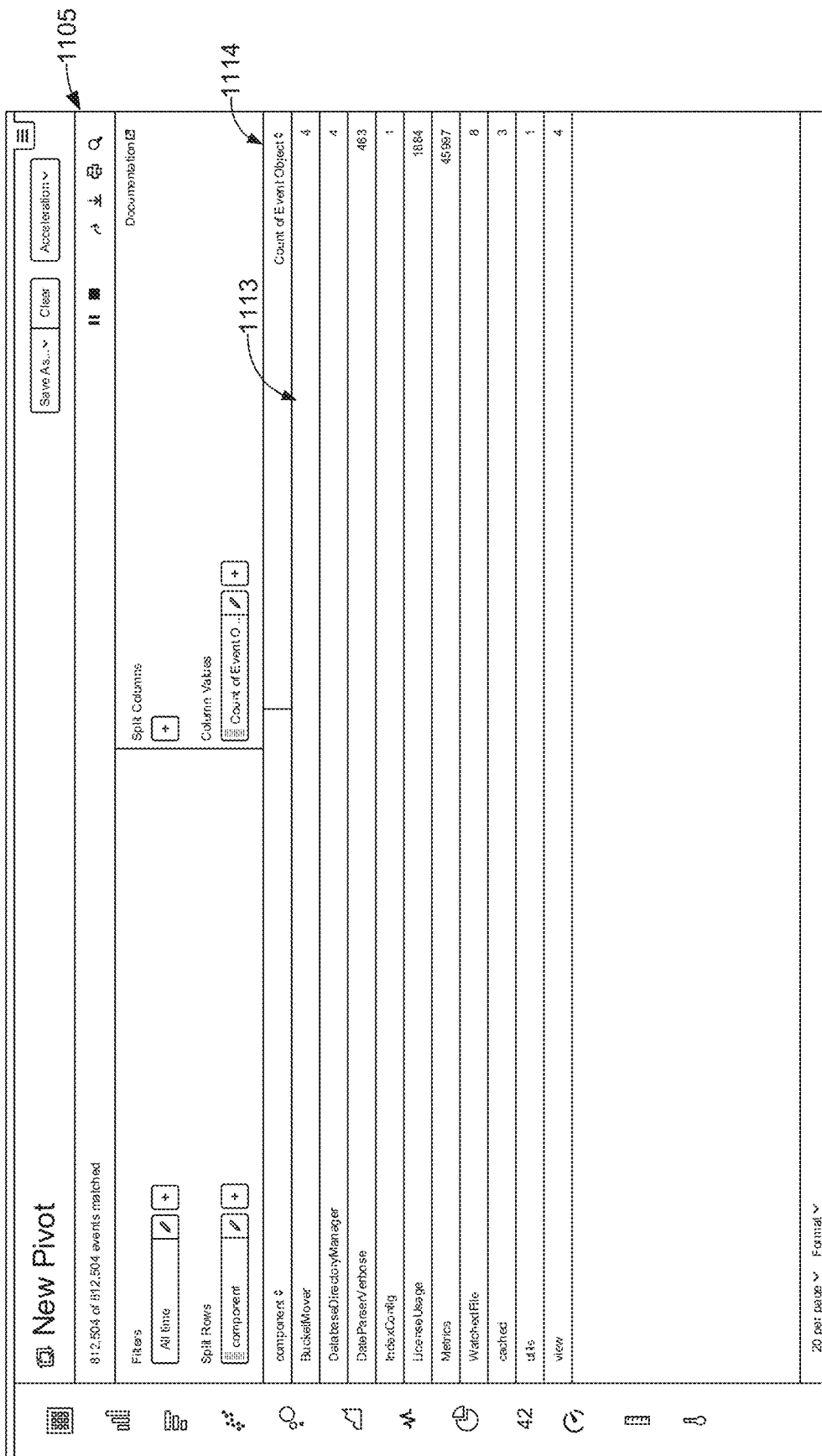

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
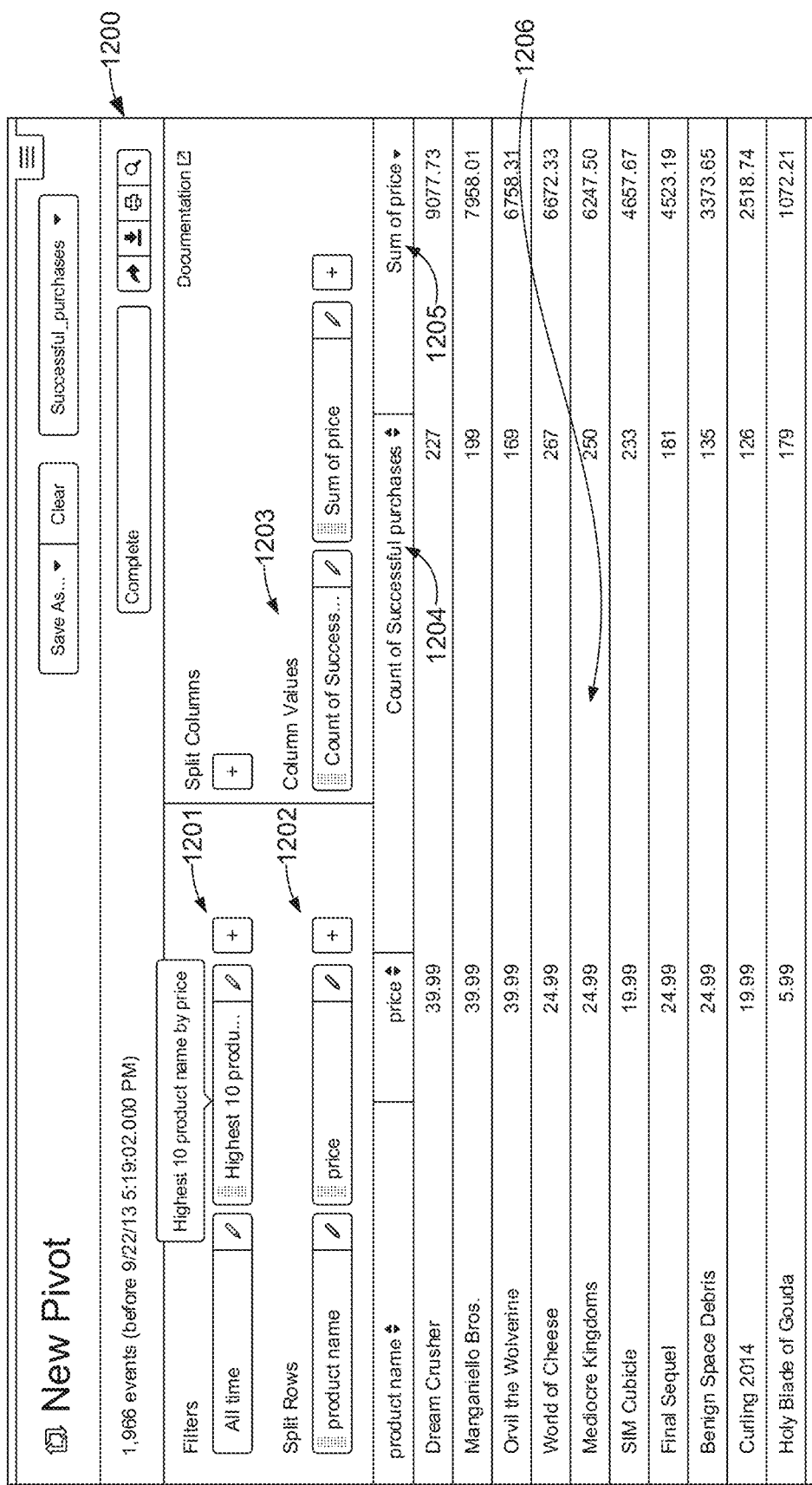

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
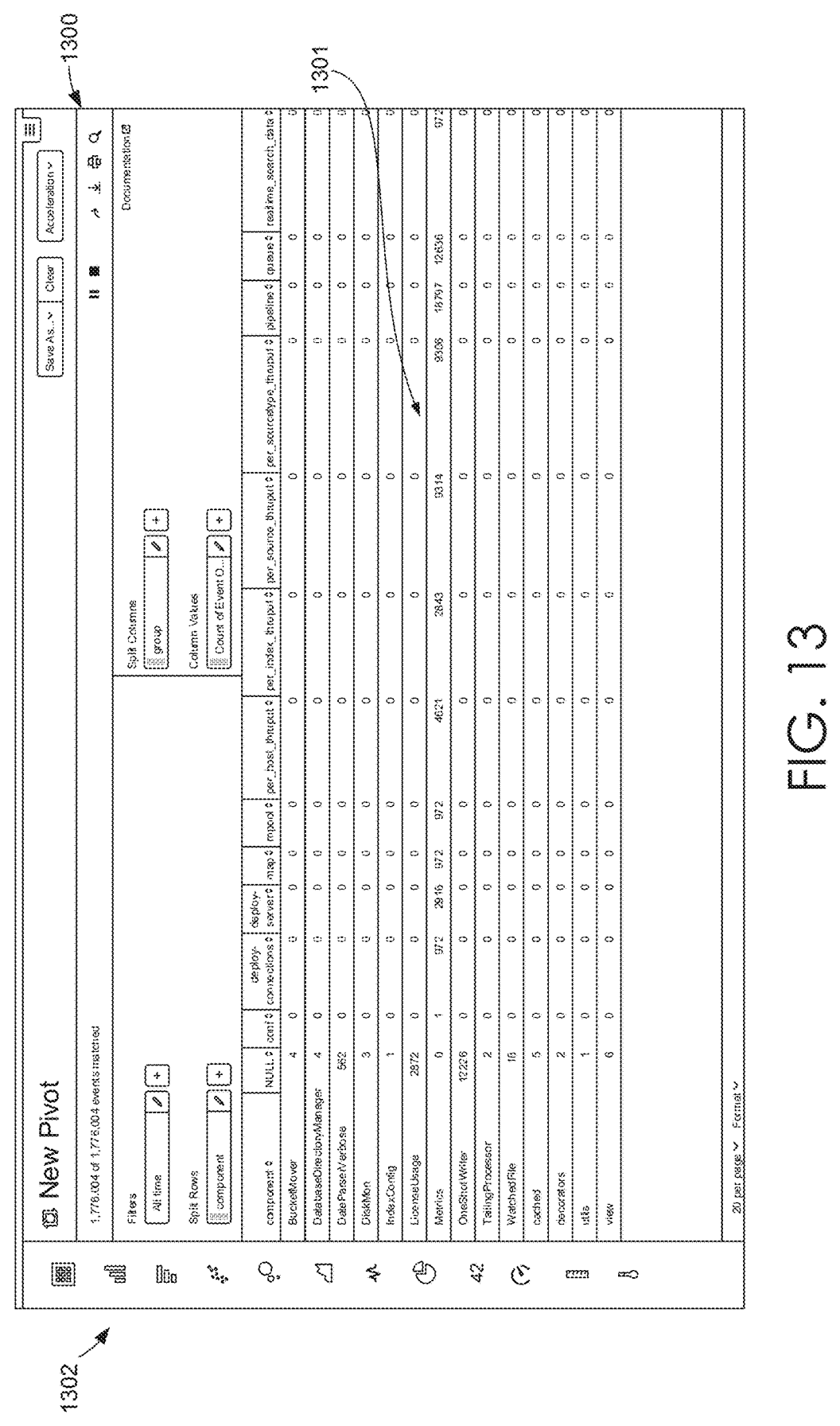
Figure 14:
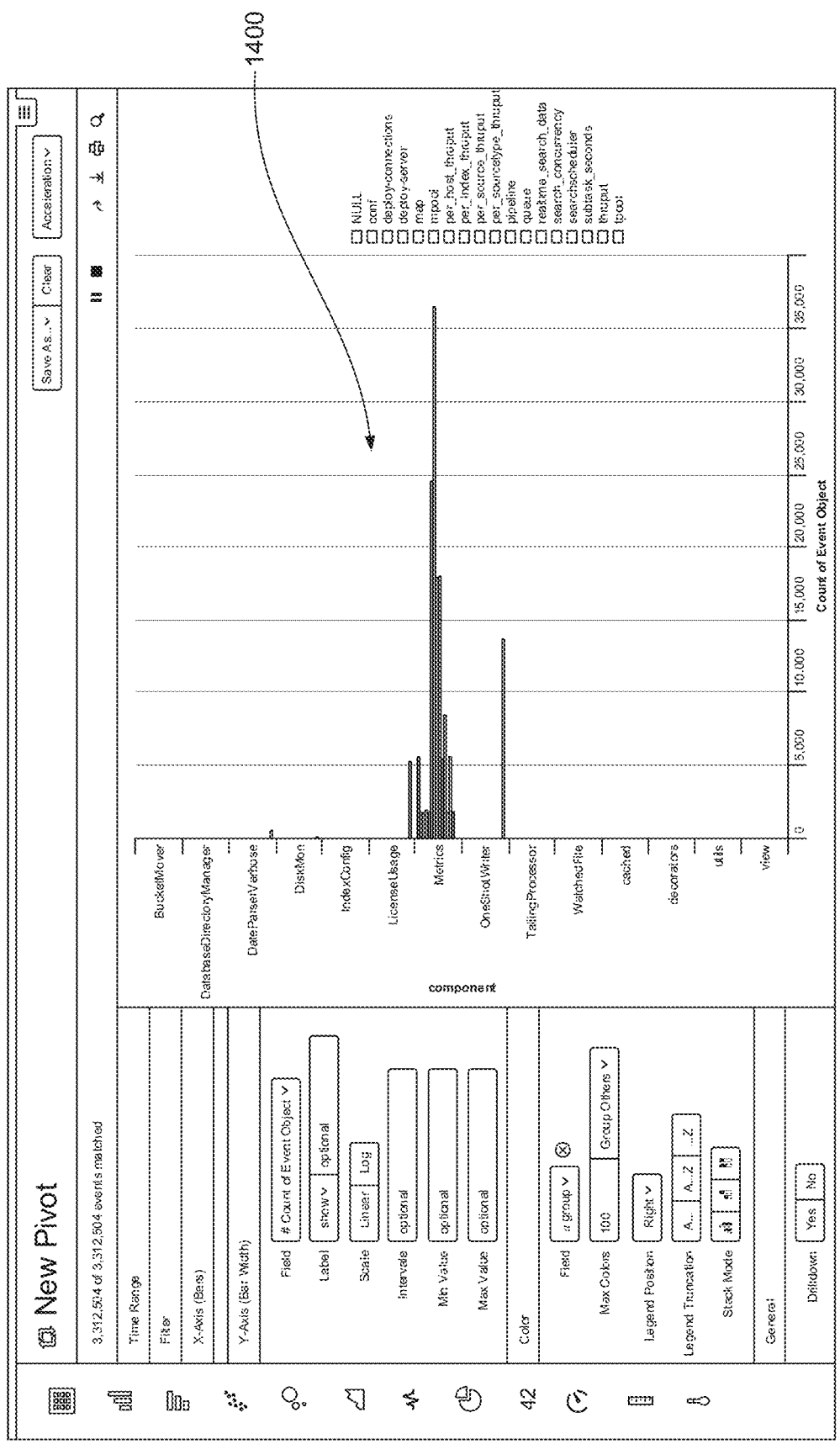
Figure 15:
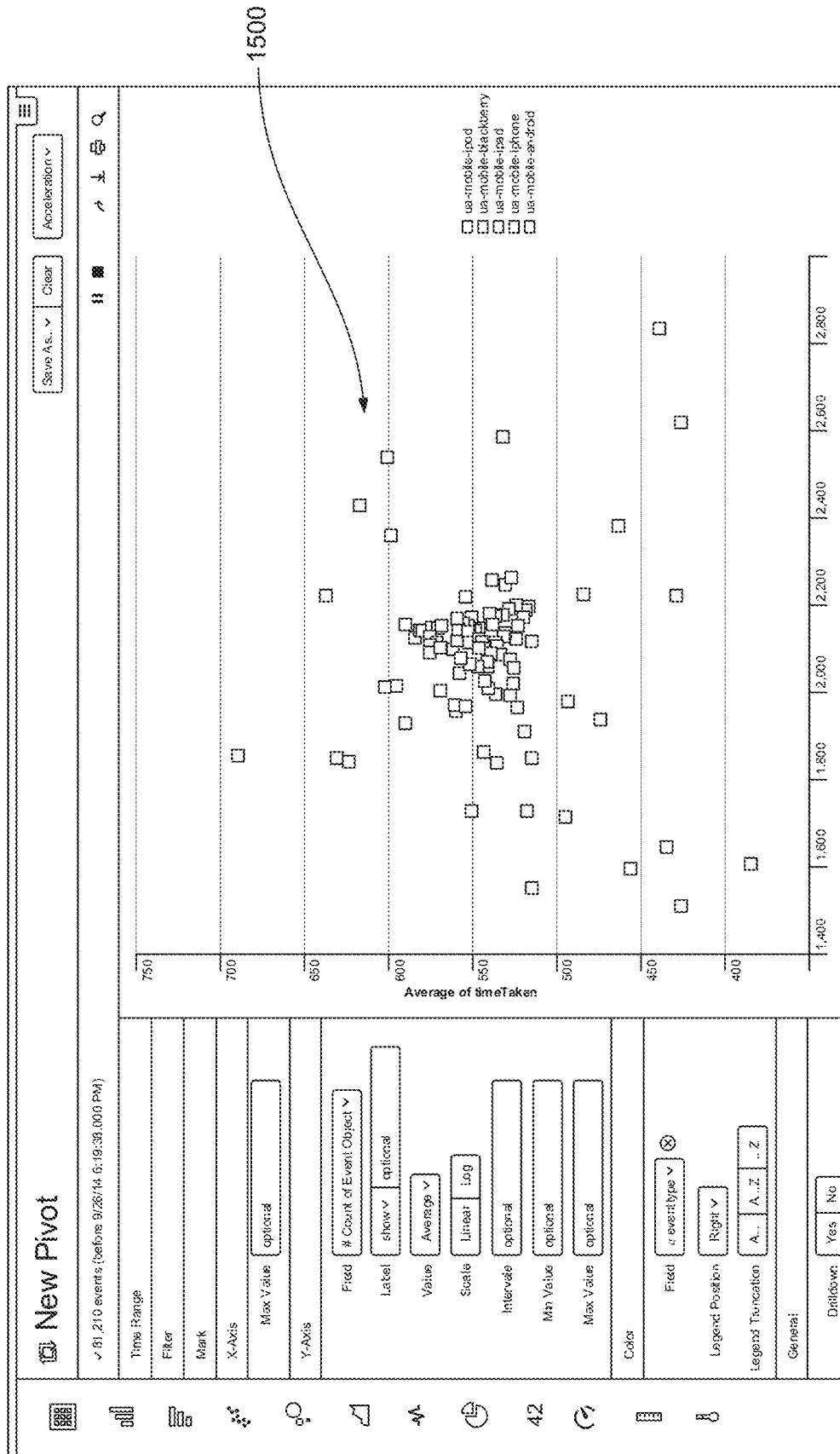

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

Figure 16:
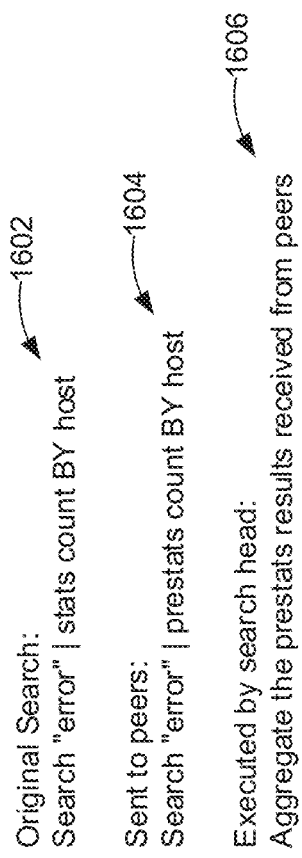
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code"

field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiments, a query can comprise an initial step that calls up a pre-generated inverted index on which further filtering and processing can be performed. For example, referring back to FIG. 6B, a set of events can be generated at block 640 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within the inverted index 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may be generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682, 925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 7C, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 722 to another filtering step requesting the user ids for the entries in inverted index 722 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
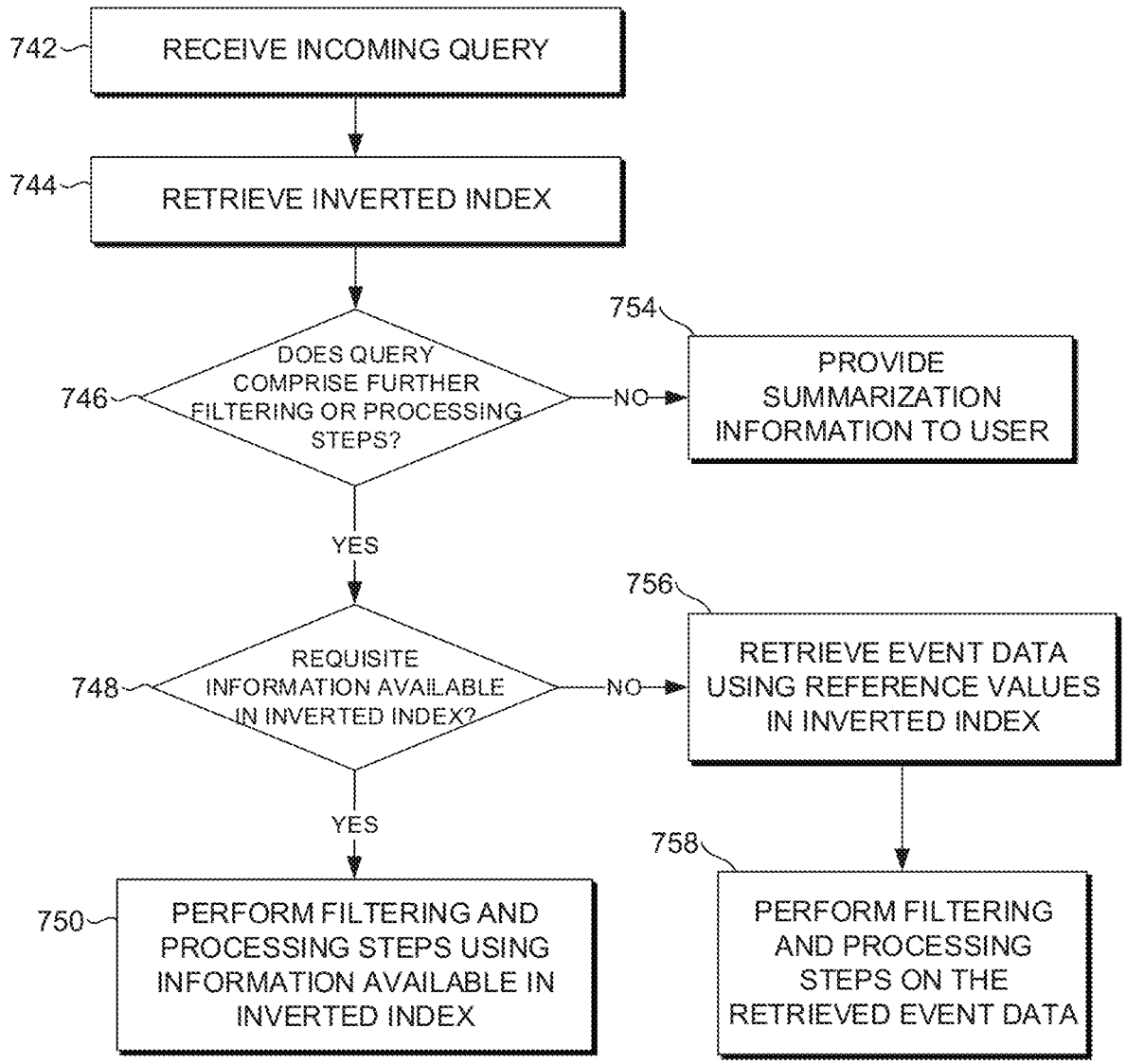
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
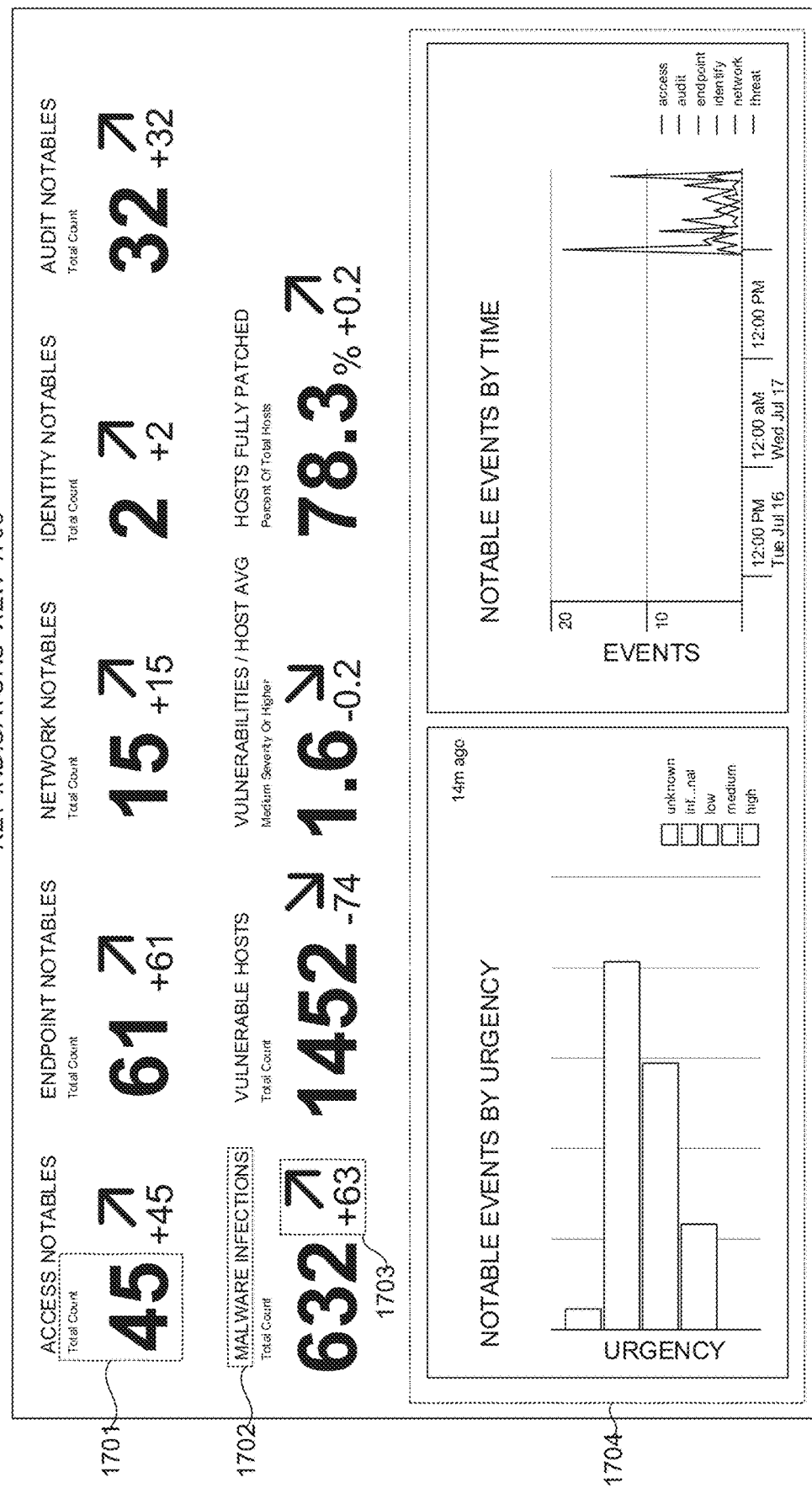
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
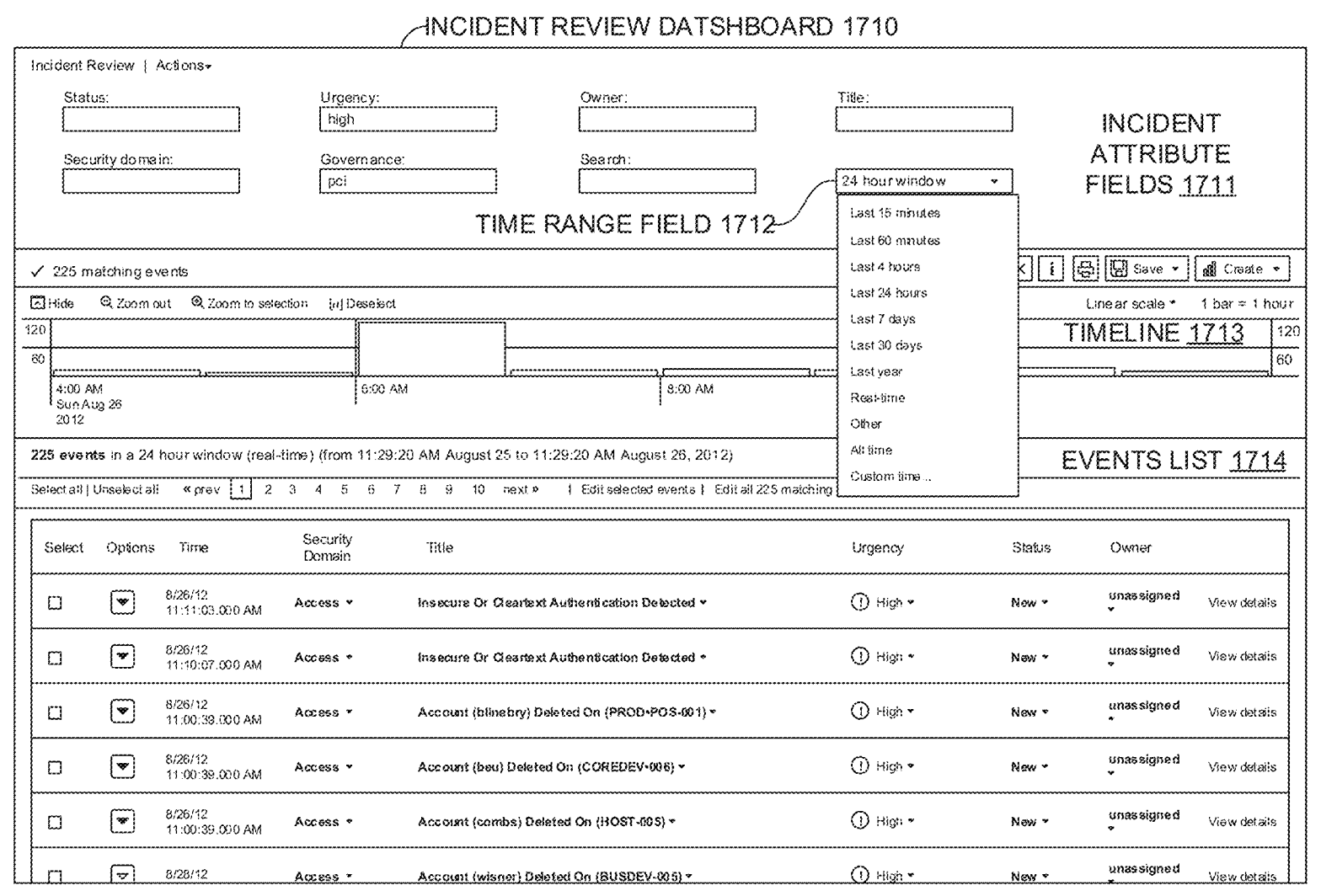

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,256, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
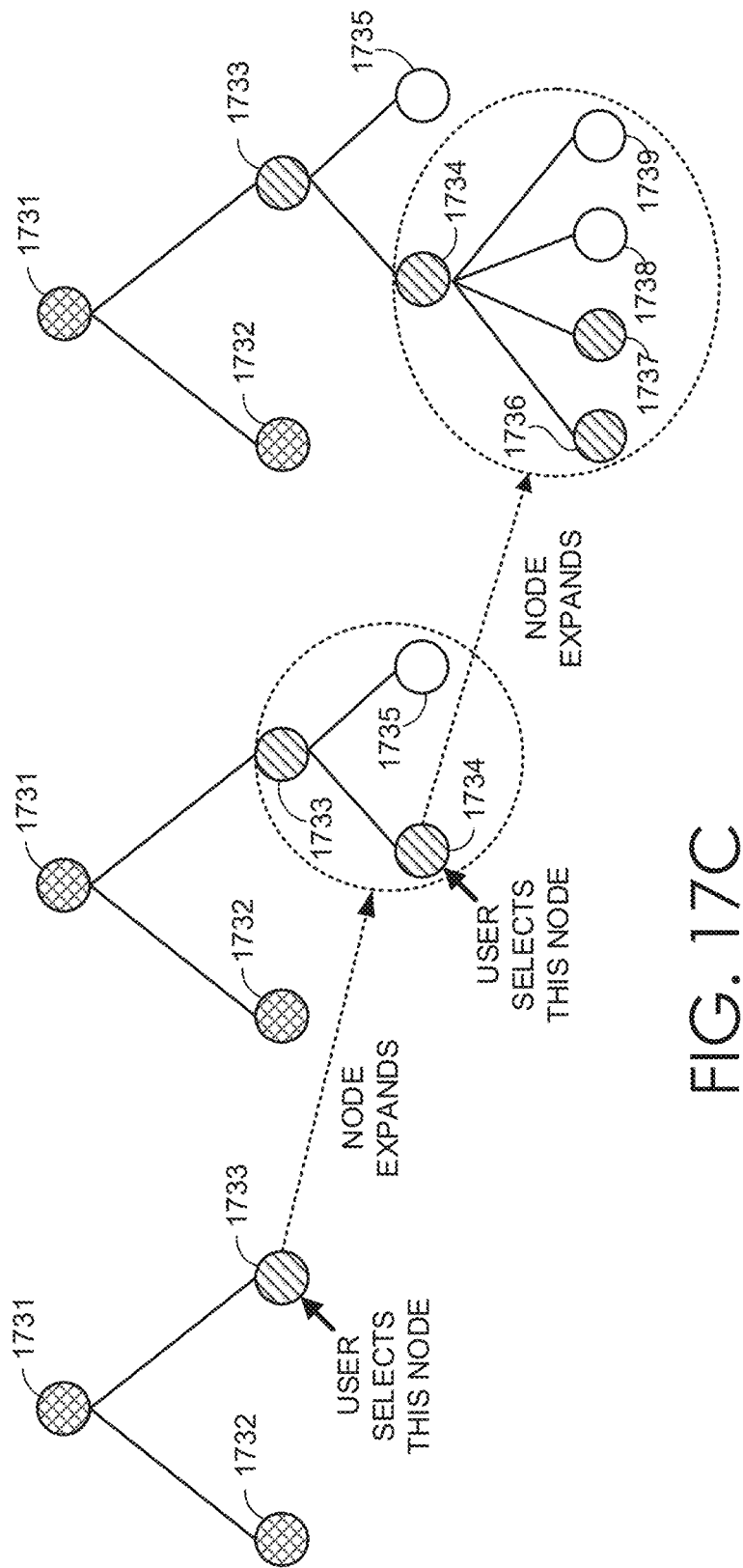
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
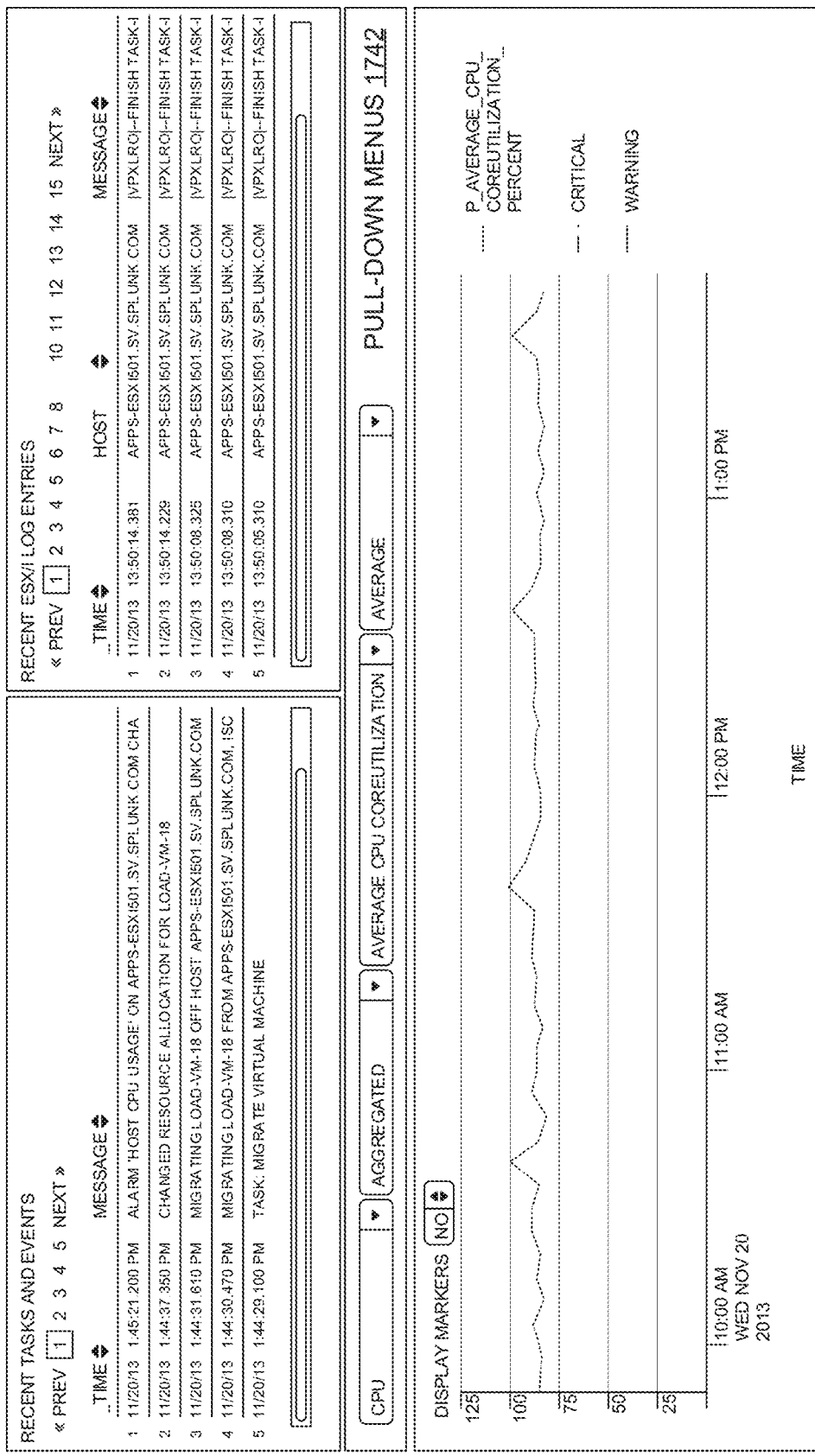
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,256, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified.

Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

2.17. Recovering Pre-Indexed Data Following a Failed Indexer

As described herein, the data intake and query system 108 can index large amounts of data using one or more indexers 206. In some cases, an indexer 206 can store a copy of the data that the indexer 206 is assigned to process in the shared storage system 254, and the cluster master 252 can track the storage of the data and the indexer 206 assigned to process the data. By storing the data in shared storage system, the indexers 206 can improve data availability and resiliency. For example, in the event an indexer 206 fails or is otherwise unable to index data that it has been assigned to index, the cluster master 252 can assign a second indexer 206 to process the data. In some such cases, the second indexer 206 can download the data from the shared storage system 254. In this way, the data intake and query system 108 can decrease the likelihood that data will be lost as it is processed by the indexers 206.

Figure 18A:
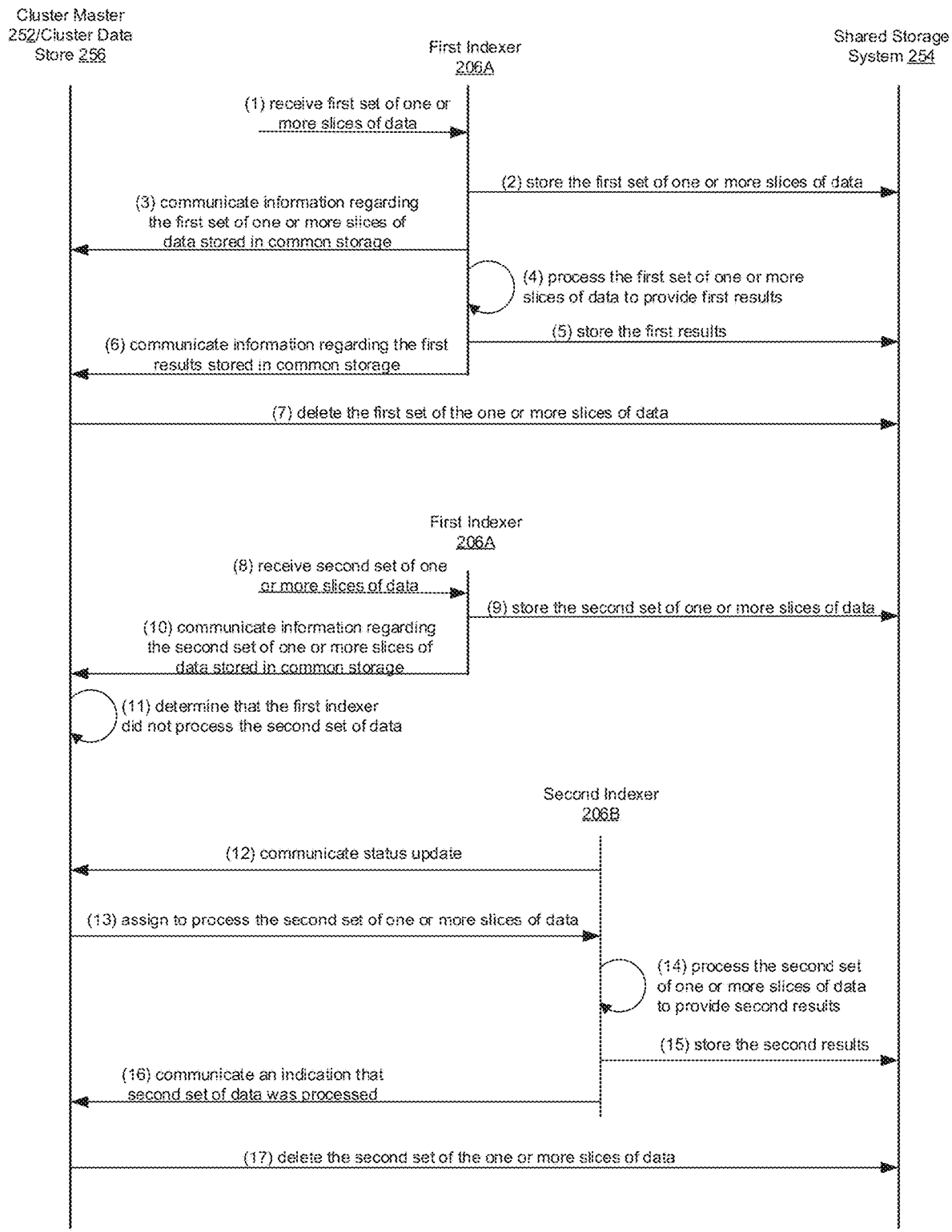
FIG. 18A is a data flow diagram illustrating an embodiment of data flow and communications illustrating an example method for recovering pre-indexed data from a shared storage system following a failed indexer.

FIG. 18A is a data flow diagram illustrating an embodiment of the data flow and communications between a variety of the components of a distributed data processing system, such as the data intake and query system 108 to recover pre-indexed data from a shared storage system following a failed indexer 206. The data flow diagram of FIG. 18A illustrates an example of data flow and communications between a first indexer 206A, a second indexer 206B, a cluster master 252, and a shared storage system 254. However, it will be understood, that in some of embodiments, one or more of the functions described herein with respect to FIG. 18A can be omitted, performed concurrently or in a different order and/or performed by a different component of the data intake and query system 108. Accordingly, the illustrated embodiment and description should not be construed as limiting.

At (1), the first indexer 206A receives a first set of one or more groups of data for processing. In the illustrated embodiment, the groups of data can correspond to slices of data to be processed by the indexer 206. A group of data can include one or more data records. A data record can include data or a reference to a location at which the data is located. Data in a data record (or in a location referenced by the data record) can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

At (2), first indexer 206A stores the first set of one or more groups of data. In some cases, the first indexer 206A can store the first set of one or more groups of data prior to processing it. In some cases, the first set of one or more groups of data are slices of data associated with an editable bucket, also referred to herein as a hot bucket. The first indexer 206A can store the first set of one or more groups of data in local storage (for example, in the data store 208A). In addition or alternatively, the first indexer 206A can store the first set of one or more groups of data in shared storage system 254. In some cases, the first indexer 206A stores the first set of one or more groups of data both locally and in shared storage system 254. In this way, the first indexer 206A can locally process the first set of one or more groups of data. However, should the first indexer 206A fail or otherwise become unavailable prior to processing the first set of one or more groups of data, an available indexer can be assigned to process at least a portion of the first set of one or more groups of data in place of the first indexer 206A, and the reassigned available indexer can retrieve the first set of one or more groups of data from its location in shared storage system 254.

In some cases, as part of storing the first set of one or more groups of data to shared storage system 216, the first indexer 206A can verify or obtain acknowledgements that the first set of one or more groups of data was stored successfully. In some embodiments, the first indexer 206A can determine information regarding the first set of one or more groups of data stored in the shared storage system 216. For example, the information can include location information regarding the first set of one or more groups of data that was stored to the shared storage system 216 or one or more data identifiers related to the first set of one or more groups of data that was copied to shared storage system 216.

At (3), the first indexer 206A communicates information regarding the first set of one or more groups of data stored in shared storage system 216 to the cluster master 252 and/or the cluster data store 256. For example, the first indexer 206A can communicate a first set of one or more data identifiers that are associated with the first set of one or more groups of data of the data, the location of the first set of one or more groups of data in shared storage system 216, etc. In this way, the cluster master 252 and/or the cluster data store 256 can be kept up-to-date with the contents of the shared storage system 216 and an indication of the indexer 206 that is responsible for processing different groups of data.

In some cases, the first indexer 206A can also provide information about the first set of one or more groups of data. As described herein, the first set of one or more groups of data can include one or more groups of data, and a group of data can include one or more data records. A group of data, or a data record, can include data from, or otherwise be associated with, indexes, sources, sourcetypes, hosts, users, etc. In some such cases, the information provided by the first indexer 206A to the cluster master 312 can include, but is not limited to, a combination of any one or more of an index identifier identifying an index associated with one or more groups of data, a source identifier identifying a source associated with one or more groups of data, a sourcetype identifier identifying a sourcetype associated with one or more groups of data, a host identifier identifying a host associated with one or more groups of data, a user identifier identifying a user associated with one or more groups of data, an indexer identifier identifying the indexer assigned to process one or more groups of data, etc. In addition or alternatively, the first set of one or more data identifiers can include a timestamp or time range associated with the first set of one or more groups of data, such as a timestamp or time range associated with a data record, group of data, set of one or more groups of data, or bucket. For example, the first set of one or more data identifiers can include an indication of an earliest or latest time associated with a data record, group of data, set of one or more groups of data, or bucket. Other information that could be used as filter criteria in association with the first set of one or more groups of data can be included as desired. In this way, the cluster master 312 can retain sufficient information to identify groups of data that are to be searched based on filter criteria received in a search.

The first location information can include a reference to a location in shared storage system 254 at which the first set of one or more groups of data was stored or a location in the shared storage system 254 that first set of one or more groups of data can be retrieved.

In response to receiving the communication from the first indexer 206A, the cluster master 252 can update the cluster data store 256 to identify that the first set of one or more groups of data has been sent to the first indexer 206A for processing, but has not yet been processed. Further, the cluster master 252 can update the cluster data store 256 to identify the location at which the first set of one or more groups of data has been stored in the shared storage system 254.

At (4), the first indexer 206A processes the first set of one or more groups of data. In some embodiments, the first indexer 206A processes the first set of one or more groups of data (or the data obtained using the first set of one or more groups of data) and stores it in buckets. As part of the processing, the first indexer 206A can determine information about the first set of one or more groups of data (for example, host, source, sourcetype), extract or identify timestamps, associated metadata fields with the first set of one or more groups of data, extract keywords, transform the first set of one or more groups of data, identify and organize the first set of one or more groups of data into events having raw machine data associated with a timestamp, etc. In some embodiments, the first indexer 206A uses one or more configuration files and/or extraction rules to extract information from the events or the first set of one or more groups of data. In some cases, as part of the processing, the first indexer 206A can generate one or more indexes associated with the buckets, such as, but not limited to, one or more inverted indexes, TSIDXs, keyword indexes, etc. The first set of one or more groups of data and the indexes can be stored in one or more files of the buckets. In addition, first indexer 206A can generate additional files for the buckets, such as, but not limited to, one or more filter files, a bucket summary, or manifest, etc.

At (5), the first indexer 206A stores results of the processing at (4). Similar to storing the first set of one or more groups of data at (3), the first indexer 206A can store the results in local storage (for example, in the data store 208A) and/or in shared storage system 254. In some cases, the first indexer 206A stores the results both locally and in shared storage system 254. In this way, should the first indexer 206A remain available, it can be utilized to execute at least a portion of one or more queries on the results. However, should the first indexer 206A fail or otherwise become unavailable, an available indexer can be assigned to execute the at least a portion of the one or more queries, and the reassigned available indexer can retrieve the results from its location in shared storage system 254.

In some cases, as part of storing the results to shared storage system 216, the first indexer 206A can verify or obtain acknowledgements that the results were stored successfully. In some embodiments, the first indexer 206A can determine information regarding the results stored in the shared storage system 216. For example, the information can include location information regarding the results that were stored to the shared storage system 216 or one or more data identifiers related to the results that were copied to shared storage system 216.

In some cases, the results are stored in or as one or more buckets, and the one or more buckets are copied to the shared storage system 216. As described herein, the buckets in the data store 208 that are no longer edited by first indexer 206A (e.g., bucket that include data that has been processed) can be referred to as warm buckets or non-editable buckets.

In some embodiments, once first indexer 206A determines that a hot bucket is to be copied to shared storage system 254, it can convert the hot (editable) bucket to a warm (non-editable) bucket, and then move or copy the warm bucket to the shared storage system 254.

At (6), the first indexer 206A communicates information regarding the results stored in shared storage system 216 to the cluster master 252 and/or the cluster data store 256. For example, the first indexer 206A can communicate an indication that the first set of the one or more groups of data was processed, location information identifying the location of the first results in shared storage system 216, etc. In some cases, an indication that the first set of the one or more groups of data was processed can include location information indicating a location in shared storage system 254 at which the first results were stored. For example, the cluster master 252 can determine that the first indexer 206A processed the first set of one or more groups of data based on its receipt of location information.

In response to receiving the communication from the first indexer 206A, the cluster master 252 can update the cluster data store 256 to identify that the first set of one or more groups of data has been processed. Further, the cluster master 252 can update the cluster data store 256 to identify the location at which the first results have been stored in the shared storage system 254.

At (7), the cluster master 252 deletes the first set of one or more groups of data from the shared storage system 254. For example, once the first results have been stored in shared storage system 254, the cluster master 252 can delete the corresponding first set of the one or more groups of data that it stored in the shared storage system 254. As a non-limiting example, of the first set of one or more groups of data include slices of a hot bucket and the first results include a warm bucket that corresponds to the hot bucket, the cluster master 252 can delete the slices of the hot bucket from the shared storage system 254 based on an indication that the corresponding warm bucket has been stored in the shared storage system 254. By removing the first set of the one or more groups of data from the shared storage system 254, the cluster master 252 can free up additional space in the shared storage system 254. In some cases, the cluster master 252 can update the cluster data store 256 to reflect that the first set of one or more groups of data has been deleted or removed from the shared storage system 254.

At (8), the first indexer 206A receives a second set of one or more groups of data. At (9), the first indexer 206A stores the second set of one or more groups of data. And at (10), the first indexer 206A communicates information regarding the second set of one or more groups of data stored in the shared storage system 254. The interactions, (8), (9), and (10), are similar to interactions (4), (5), (6), and (8) discussed above, and therefore will not be re-described.

At (11), the cluster master 252 determines that the first indexer 206A did not process the second set of one or more groups of data. As described herein, the cluster master 252 monitors the indexers 206 (including the first indexer 206A) of the data intake and query system 108. Monitoring the indexers 206 can include requesting and/or receiving status information from the indexers 206. In some embodiments, the cluster master 252 passively receives status information from the indexers 206 without explicitly requesting the information. For example, the indexers 206 can be configured to periodically send status updates to the cluster master 252. In certain embodiments, the cluster master 252 receives status information in response to requests made by the cluster master 252. In some cases, the cluster master 252 can determine that the first indexer 206A did not process the second set of one or more groups of data based on the status information or absence of communications or "heartbeats" from the first indexer 206A.

In some cases, the cluster master 252 can determine that the first indexer 206A did not process the second set of one or more groups of data based on a determination that the first indexer 206A is unavailable or failing. For example, in some cases, the cluster master 252 can determine that the first indexer 206A is unavailable if one or more metrics associated with the first indexer 206A satisfies a metrics threshold. For example, the cluster master 252 can determine that the first indexer 206A is unavailable if a utilization rate of the first indexer 206A satisfies a utilization rate threshold and/or if an amount of available memory available to the first indexer 206A satisfies a memory threshold. As another example, the cluster master 252 can determine that the first indexer 206A is unavailable if an amount of available processing resources of the first indexer 206A satisfies a processing resources threshold. As a corollary, in some cases, the cluster master 252 can determine that the first indexer 206A is available based on a determination that one or more metrics associated with the first indexer 206A does not satisfy a metrics threshold.

In the event an assigned indexer (in this example, the first indexer 206A) becomes unresponsive or unavailable during the processing of the data to which it is assigned, the cluster master 252 can re-assign data of the unavailable indexer to one or more available indexers. Accordingly, the data intake and query system 315 can quickly recover from an unavailable or unresponsive component without data loss and while reducing or minimizing delay. In this example, the first indexer 206A is determined to have become unresponsive or unavailable.252

At (12), the cluster master 252 receives a status update communication from a second indexer 206B, thereby indicating that the second indexer 206B is available for processing. Based at least in part on a determination that the second indexer 206B is available for processing, at (13), the cluster master 252 assigns the second indexer 206B to process the second set of one or more groups of data. In some cases, the second indexer 206B is assigned to process only a portion of the second set of one or more groups of data. For example, the cluster master 252 may distribute the processing of the second set of one or more groups of data among multiple available indexers 206 and/or the cluster master 252 may determine that the first indexer 206A processed some portion of the second set of one or more groups of data.

At (14), the second indexer 206B processes the second set of one or more groups of data to provide second results. At (15), the second indexer 206A stores the second results. At (16), the second indexer 206A communicates information regarding the second results stored in the shared storage system 254. And at (17), the cluster master 252 deletes the second set of the one or more groups of data from shared storage system 254. The interactions (14), (15), (16), and (17), are similar to interactions (4), (5), (6), and (8) discussed above, and therefore will not be re-described.

In certain embodiments, (1)-(7) may be omitted. For example, in some such embodiments, the data flow diagram of FIG. 18A can include only those steps relating to the failure of the first indexer 206A and the recovery of the second set of one or more groups of data from the shared storage system 254. For example, in some cases, the first indexer 206A is not assigned/does not receive the first set of one or more groups of data to process.

Figure 18B:
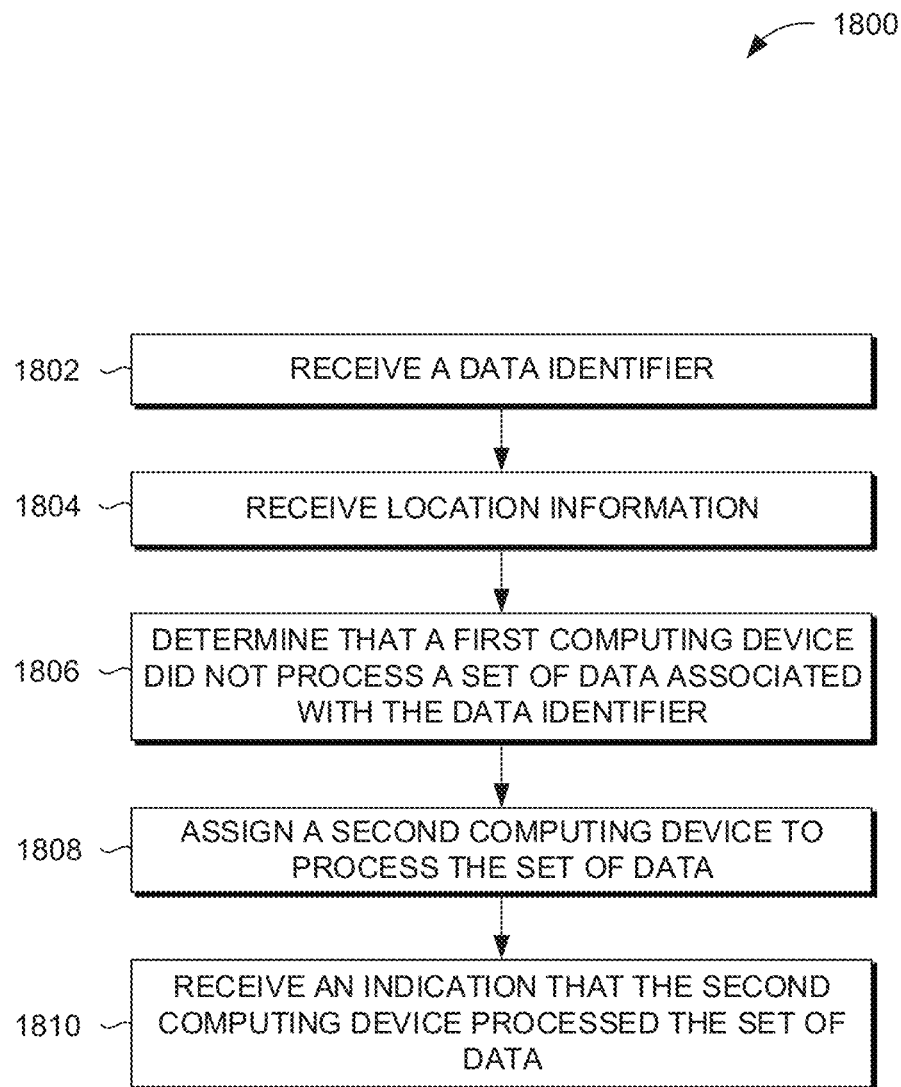
FIG. 18B is a flow diagram illustrative of an embodiment of a routine, implemented by a computing device of a distributed data processing system, recovering pre-indexed data from a shared storage system following a failed indexer.

FIG. 18B is a flow diagram illustrative of an embodiment of a routine 1800, implemented by a computing device of a distributed data processing system, recovering pre-indexed data from a shared storage system following a failed indexer. Although described as being implemented by the cluster master 252 of the data intake and query system 108, it will be understood that the elements outlined for routine 1800 can be implemented by one or more computing devices/components that are associated with the data intake and query system 108, such as, but not limited to, the cluster data store 256, the search head 210, the shared storage system 254, the indexer 206, etc. Thus, the following illustrative embodiment should not be construed as limiting.

At block 1802, the cluster master 252 receives a data identifier from a first indexer 206A. As described, the data identifier can identify, or be associated with, a set of one or more groups of data that the first indexer 206A is assigned to process. In some cases, the one or more groups of data can correspond to one or more slices of data of a hot bucket being processed by the first indexer 206A.

In some cases, the set of one or more groups of data includes a single group of data. In some cases, the set of one or more groups of data includes more than one group of data. As described, a group of data can include one or more data records. A data record can include data or a reference location at which the data is located. Data in a data record (or in a location referenced by the data record) can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

At block 1804, the cluster master 252 receives location information from the first indexer 206A. As described herein, the location information can include a reference to a first location in shared storage system 254. The first location can be the first location in shared storage system 254 at which the set of one or more groups of data was stored.

At block 1806, the cluster master 252 determines that the first indexer 206A did not process the set of one or more groups of data. The cluster master 252 can determine whether the first indexer 206A processed the set of one or more groups of data using any combination of various techniques described herein. For example, the cluster master 252 can determine that the first indexer 206A did not process the set of one or more groups of data based on status update communications or absence thereof.

At block 1810, the cluster master 252 assigns a second indexer 206B to process the set of one or more groups of data. In some cases, assigning the second indexer 206B to process the set of one or more groups of data includes communicating an indication of at least one of the first location or the data identifier to the second indexer 206B. In some embodiments, the cluster master 252 assigns the second indexer 206B based on a determination that the second indexer 206B is available. In certain embodiments, the cluster master 252 assigns the second indexer 206B to process a portion of the set of one or more groups of data and assigns other indexers 206 to process other portions.

At block 1812, the cluster master 252 receives an indication that the second indexer 206B has successfully processed the set of one or more groups of data. In some cases, to successfully process the set of one or more groups of data, the second indexer 206B obtains or downloads the set of one or more groups of data from the first location, processes the set of one or more groups of data to provide results, and uploads the results to a second location in the shared storage system 254.

As part of the successfully processing the set of one or more groups of data, the second indexer 206B can obtain or download the set of one or more groups of data from the first location in shared storage system 254. Further, as part of the successfully processing the set of one or more groups of data, the second indexer 206B can determine information about the set of one or more groups of data (for example, host, source, sourcetype), extract or identify timestamps, associated metadata fields with the set of one or more groups of data, extract keywords, transform the set of one or more groups of data, identify and organize the set of one or more groups of data into events having raw machine data associated with a timestamp, etc. In certain cases, the second indexer 206B organizes the events into buckets and stores the buckets. In some embodiments, the second indexer 206B uses one or more configuration files and/or extraction rules to extract information from the events or the set of one or more groups of data. In some cases, as part of successfully processing the set of one or more groups of data, the second indexer 206B can generate one or more indexes associated with the buckets, such as, but not limited to, one or more inverted indexes, TSIDXs, keyword indexes, etc.

In some cases, as part of the successfully processing the set of one or more groups of data, the second indexer 206B can store the set of one or more groups of data and the indexes in one or more files of the buckets. In addition, the second indexer 206B can generate additional files for the buckets, such as, but not limited to, one or more filter files, a bucket summary, or manifest, etc.

Fewer, more, or different blocks can be used as part of the routine 1800. In some cases, one or more blocks can be omitted. In some embodiments, the blocks of routine 1800 can be combined with any one or any combination of blocks described herein with reference to at least FIGS. 18A and/or 19A-20B.

In certain embodiments, the cluster master 252 and/or the second indexer 206B can delete the set of one or more groups of data (or the one or more buckets that include the set of one or more groups of data) from shared storage system 254. For example, once the second indexer 206B successfully processes the set of one or more groups of data, the cluster master 252 and/or the second indexer 206B can delete the set of one or more groups of data (that was stored by the first indexer 206B) from shared storage system. In this way, the cluster master 252 and/or the second indexer 206B can reduce the amount of data stored in shared storage system 254. In some cases, the cluster master 252 and/or the second indexer 206B delete the set of one or more groups of data based on the location information received from the first indexer 206A at block 1804. For example, the cluster master 252 and/or the second indexer 206B can determine the location, in shared storage system 254, of the set of one or more groups of data based on the location information.

Furthermore, it will be understood that the various blocks described herein with reference to FIG. 18B can be implemented in a variety of orders, or can be performed concurrently. For example, the cluster master 252 can concurrently receive the data identifier and the location information, etc.

2.18. Mapping Groups of Data and Indexers to a Bucket Map Identifier for Searching As described herein, the data intake and query system 108 can index and search large amounts of data in a distributed fashion using one or more indexers 206. In some cases, each indexer 206 can concurrently index, store, and search data. Due to a lag between the time at which data is received and the time at which the data is available for searching, the data intake and query system 108 may receive a query indicating that received (but unavailable for search) data is to be included as part of the query. For example, the received data may satisfy the filter criteria of the query even though it was not in a state to be searched. In some cases, to provide the indexers 206 (also referred to herein as search peers) additional time to index the data and make it available for search, a cluster master 252 can dynamically track what data is available for searching by different indexers and map the data to filter criteria using a bucket map identifier. When a search head receives a query, it can request a bucket map identifier from the cluster master and send the bucket map identifier to the search peers that will be executing the query. The search peers can use the bucket map identifier to request the individual buckets that they are assigned to search. By passing a bucket map identifier between the cluster master (instead of data identifiers), search head, and search peers, the data intake and query system 108 can provide the indexers 206 more time to make data available for searching. In some such cases, if the data is made available between the time that the search head 210 requests a bucket map identifier and the time that individual search peers request individual buckets for searching (or any time before the cluster master 252 tells the search peer what buckets it is to search), then the data can be included in the search.

FIG. 19A is a data flow diagram illustrating an embodiment of data flow and communications between a variety of the components of a distributed data processing system, such as the data intake and query system 108, for identifying one or more groups of data to be searched by a search peer. The data flow diagram of FIG. 19A illustrates an example of data flow and communications between the cluster master 252, the search head 210, and an indexer 206 (also referred to herein as search peer 206). However, it will be understood, that in some of embodiments, one or more of the functions described herein with respect to FIG. 19A can be omitted, performed concurrently, or in a different order and/or performed by a different component of the data intake and query system 108. Accordingly, the illustrated embodiment and description should not be construed as limiting.

At (1), the search head 210 receives a query, as described herein. In some cases, the search head 210 can receive the query from a client device 102. The query can be in a query language as described in greater detail herein.

At (2), the search head 210 identifies filter criteria associated with the query. For example, the search head 210 can parse the query to identify the filter criteria. As described herein, a query can identify a set of data and a manner of processing the set of data. The filter criteria can be used to identify the set of data, whereas processing criteria can be used to determine the manner of processing the set of data. Example filter criteria can include, but is not limited to, indexes (or partitions), hosts, sources, sourcetypes, time ranges, field identifier, field-value pairs, and/or keywords, etc.

At (3), the search head 210 communicates an indication of at least a portion of the filter criteria of the query to the cluster master 252. In some cases, the search head 210 communicates a subset of the filter criteria of the query to the cluster master 252. In certain embodiments, the search head 210 communicates all of the filter criteria to the cluster master 252. In certain cases, the search head 210 communicates the filter criteria that corresponds to the filter criteria used by the cluster master 252 to identify bucket map identifiers. For example, if the cluster master 252 uses an index identifier and a time range, then the search head 210 communicates the index identifier and the time range to the cluster master 252. If the cluster master 252 tracks additional filter criteria (e.g., host, source, sourcetype, etc.), the search head 210 can communicate that filter criteria to the cluster master 252. In some cases, the search head 210 communicates filter criteria to the cluster master 252 to request a bucket map identifier from the cluster master 252.

At (4a), the cluster master 252 determines a bucket map identifier based on the received filter criteria. In some cases, the cluster master 252 determines a bucket map identifier by creating a bucket map identifier and/or by identifying a bucket map identifier that is associated with the received filter criteria.

As described herein, as queries are received, the cluster master 252 can be used to identify the groups of data that are to be searched as part of the query. This identification process can include comparing the filter criteria of the search with information about the different groups of data stored in the data intake and query system 108. For example, if the filter criteria includes a time range of "last hour," and index "main," the cluster master 252 can review the cluster data store 256 to identify all of the groups of data that are in the index "main," and have a timestamp within the "last hour." For each group of data identified, the cluster master 252 can identify a corresponding data identifier that can be used to locate, retrieve, or otherwise identify the group of data for searching, and/or a search peer that is responsible for searching the group of data.

To facilitate the identification of groups of data, the cluster master 252 can associate filter criteria with data identifiers of the groups of data that satisfy the filter criteria and identifiers of the search peers assigned to search the groups of data. In some cases, the cluster master 252 can identify these associations using a bucket map identifier. Thus, if the same filter criteria is used in a subsequent search, the cluster master 252 can efficiently identify the groups of data to be searched and the search peers that will be used for the search. If a search peer fails or becomes unavailable, or is no longer responsible for a particular group of data, the cluster master 252 can update the information in the relevant bucket map identifiers.

Accordingly, as described herein, a particular bucket map identifier can be associated with particular filter criteria, one or more particular groups of data that satisfy the particular filter criteria, and/or one or more particular search peer 206 associated with the particular groups of data (e.g., the search peers assigned to search the particular groups of data as part of a query).

Upon receipt of the filter criteria, the cluster master 252 can consult the cluster data store 256 to determine whether the filter criteria of the query matches filter criteria from a previous search. If a match is found, the cluster master 252 can use the cluster data store 256 to identify a bucket map identifier that corresponds to the filter criteria. For example, the cluster master 252 can compare the filter criteria from the search with filter criteria stored in the cluster data store 256. In some cases, if the cluster master 252 determines that the filter criteria from the search matches filter criteria that is stored in the cluster data store 256, then the cluster master 252 identifies the bucket map identifier that is associated with the filter criteria stored in the cluster data store 256.

In some cases (for example, if the filter criteria cannot be found in the cluster data store 256), the cluster master 252 can create a new mapping that maps, for example, the filter criteria from the search to a bucket map identifier, one or more groups of data that satisfy the filter criteria from the search, and/or one or more search peers 206 responsible for searching the one or more groups of data. For example, using the filter criteria, the cluster master 252 can identify one or more relevant groups of data, such as one or more slices of data (e.g., in hot ("editable") buckets) or other data (e.g., a warm (non-editable) bucket), to be searched and can associate a new bucket map identifier with the identified one or more relevant groups of data. As an example, if the filter criteria includes a time range, the cluster master 252 can identify one or more groups of data that include data that satisfy at least a portion of the time range. For instance, if the time range includes the last hour then the cluster master 252 can identify as relevant all groups of data storing slices of data or events associated with timestamps within the last hour.

At (4b), the cluster master 252 identifies a set of search peer identifiers. In some cases, search peer identifiers can correspond to indexer identifiers. In some cases, to identify the set of indexer identifiers, the cluster master 252 determines which search peers are assigned to the groups of data that satisfy the filter criteria of the search. The indexer-group of data assignments can be stored in the cluster data store 256.

In some cases, the indexer-group of data assignments can be based on which indexers processed and/or stored the data. For example, if an indexer 206 processed a group of data then it can be assigned to search the group of data. In certain cases, a group of data processed by an indexer may no longer reside in a local or shared data store of the indexer. For example, after a predetermined amount (e.g., based on time it was first stored or last time used, etc.) of time groups of data on an indexer can be deleted (but retained in the shared storage system 254). In some such cases, the cluster master 252 can determine an indexer-group of data assignment for the group of data. In certain cases, the cluster master 252 can map the group of data to the same indexer 206 that processed it. As another example, in some cases, a group of data can be assigned to a different indexer 206 that did not index, process, and/or locally store the group of data. In some cases, an indexer 206 can be assigned to a particular group of data based on the availability of that indexer, or the unavailability of another indexer. For example, if the indexer that locally stores particular group of data becomes unavailable, another indexer can be at least temporarily assigned to that particular group of data.

At (5), the cluster master 252 communicates the bucket map identifier and/or the set of search peer identifiers to the search head 210 and, at (6), the search head 210 communicates the bucket map identifier to each of the search peers 206 identified by the set of search peer identifiers. In some cases, the search head 210 communicates the bucket map identifier concurrently to each of the search peers 206 identified by the set of search peer identifiers. In some cases, the search head 210 can also communicate a query, or a portion of a query, for the search peers 206 to execute. As described herein, in some cases, each search peer 206 may only execute a portion of a received query. For example, a query can include a search across multiple search peers 206 and the results obtained from each search peer can be further processed by the search head 210. Accordingly, a particular search peer may only search a portion of the set of data of a search and may only execute a portion of the query.

At (7), the cluster master 252 updates the cluster data store 256 to associate the bucket map identifier with an additional group of data. As described herein, a group of data can be a set of one or more slices of data (e.g., in hot ("editable") buckets) or other data (e.g., a warm (non-editable) bucket).

In some cases (for example, similar to interactions (1), (2), and (3) of FIG. 18A), the data intake and query system 108 can receive one or more new groups of data, such as a set of one or more slices of data, that have not been indexed and/or stored in a warm bucket. In some cases, the new group of data satisfies the filter criteria for which the cluster master 252 has previously generated a bucket map identifier. In some such cases, the cluster master 252 can update the cluster data store 256 to associate the new group of data with the bucket map identifier.

As another example (for example, similar to interactions (4), (5), and (6) of FIG. 18A), an indexer 206 can process a set of one or more slices of data and store the results locally and in shared storage system 254 as one or more buckets. In some cases, the newly stored results may satisfy at least a portion of filter criteria for which the cluster master 252 has previously mapped a second bucket map identifier. In some such cases, the cluster master 252 updates the cluster data store 256 to associate the newly stored results with the second bucket map identifier. In some cases, the cluster master 252 also updates the cluster data store 256 to disassociate the set of one or more slices of data from the second bucket map identifier. It will be understood that the cluster master 252 can update the associations (e.g., data identifiers, indexer identifiers, etc.) of a bucket map identifier at any time, and that the placement of (7) is for illustrative purposes only. For example, the cluster master 252 can update the bucket map identifier associations whenever an indexer 206 fails or is added, new slices of data are received, hot buckets are converted to warm buckets, warm buckets are stored to shared storage system 254, warm bucket are deleted from an indexer 206, and/or slices are deleted from the shared storage system 254, etc.

At (8), the search peer 206 communicates the bucket map identifier to the cluster master 252. As described, the bucket map identifier can be associated with one or more particular groups of data that satisfy the particular filter criteria, and can be associated with the search peer 206. The cluster master 252 consults the cluster data store 256 to identify the particular groups of data with which the bucket map identifier and the search peer 206 are associated (and the data identifiers of the particular groups of data). In the illustrated embodiment of FIG. 19A, the groups of data may correspond to buckets of data and/or slices of data.

As described herein, in some embodiments, a bucket map identifier may not be associated with data that has not been indexed/processed (e.g., slices of data or hot buckets). This may be due to the transient nature of the unprocessed/unindexed data (including partially indexed/processed data). For example, the unprocessed/unindexed data remains so for a relatively short period of time, such as one second, etc. In some such embodiments, the cluster master 252 can use the bucket map identifier to obtain a list of data identifiers corresponding to indexed/processed groups of data (e.g., warm buckets) that are to be searched by the search peer 206, and use an indexer assignment listing to identify data identifiers corresponding to unprocessed/unindexed groups of data (e.g., slices of data or hot buckets) associated with the search peer 206 that are to be searched. In some cases, the cluster master 252 can identify all of the unprocessed/unindexed groups of data associated with the search peer for searching. In certain cases, such as when the cluster master 252 includes information about the unprocessed/unindexed data (e.g., time range, index, or other information that can compared with filter criteria of a query), the cluster master 252 can identify a subset of the unprocessed/unindexed groups data associated with the search peer for searching (e.g., those portions that satisfy the filter criteria of the query).

At (9), the cluster master 252 communicates a set of data identifiers to the search peer 206 to execute at least a portion of the query. The set of data identifiers can include one or more data identifiers, and can identify the particular groups of data with which the bucket map identifier and the search peer 206 are associated. For example, the data identifiers sent to a particular search peer 206 can identify one or more buckets or slices of data that are to be searched by the particular search peer 206. After receiving the set of data identifiers, the search peer 206 can execute at least a portion of a query on the groups of data corresponding to the set of data identifiers. In some cases, executing the portion of the query on the groups of data can include applying filter criteria to one or more events of buckets or slices of data to generate partial query results, and communicating the partial query results to the search head 210. As described herein, the search head 210 can combine the partial query results from the different search peers 206 to generate query results and return the query results to a user.

Figure 19B:
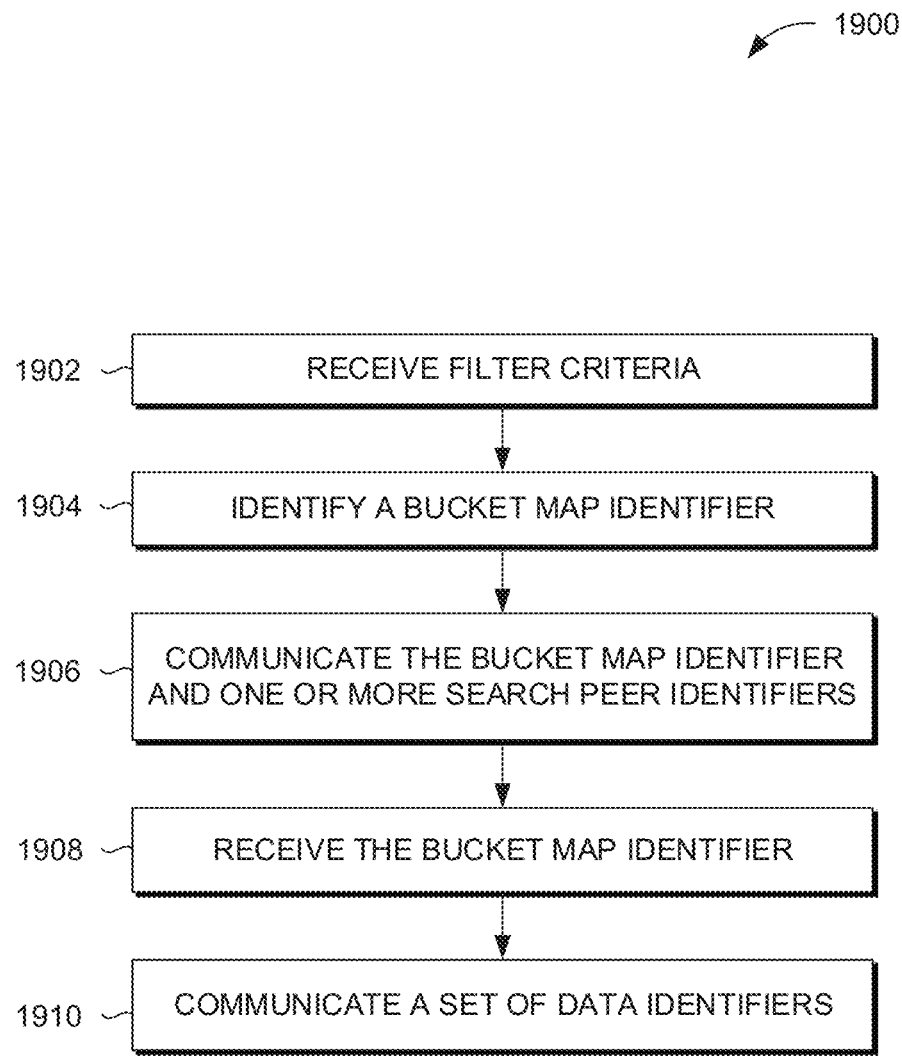
FIG. 19B is a flow diagram illustrative of an embodiment of a routine, implemented by a computing device of a distributed data processing system for identifying data to be searched using a bucket map identifier.

FIG. 19B is a flow diagram illustrative of an embodiment of a routine 1900, implemented by a computing device of a distributed data processing system, for identifying groups of data for searching. Although described as being implemented by the cluster master 252 of the data intake and query system 108, it will be understood that the elements outlined for routine 1900 can be implemented by one or more computing devices/components that are associated with the data intake and query system 108, such as, but not limited to, the cluster data store 256, the search head 210, the shared storage system 254, the search peer 206, etc. Thus, the following illustrative embodiment should not be construed as limiting.

At block 1902, the cluster master 252 receives filter criteria associated with a query from a search head 210. As described herein, the search head 210 can receive a query and can parse the query to identify filter criteria. The filter criteria can correspond to at least a portion of the query. Example filter criteria can include, but is not limited to, indexes (or partitions), hosts, sources, sourcetypes, time ranges, field identifier, field-value pairs, and/or user identifiers, keywords, etc.

At block 1904, the cluster master 252 identifies a bucket map identifier based on the filter criteria. As described herein, a bucket map identifier can associate filter criteria with data identifiers corresponding to groups of data that satisfy the filter criteria. Accordingly, in certain embodiments, to identify the bucket map identifier, the cluster master 252 can compare the filter criteria of the search with the filter criteria of the bucket map identifiers that it stores. If the filter criteria of the search matches the filter criteria associated with a bucket map identifier, the cluster master 252 can identify the bucket map identifier. As described herein, in certain embodiments, the bucket map identifier can identify the groups of data that satisfy the filter criteria and the search peers assigned to search the groups of data that satisfy the filter criteria.

If the filter criteria of the search does not match the filter criteria of any of the bucket map identifiers, the cluster master 252 can compare the filter criteria with information about the groups of data stored in the data intake and query system 108. As described herein, this information can be stored in the cluster master data store 256 and can include data identifiers associated with information about groups of data associated with the data identifiers. If the information about a particular group of data satisfies the filter criteria, its data identifier can be added to a set of data identifiers. The cluster master 252 can generate a bucket map identifier and associate it with the set of data identifiers. The cluster master 252 can also track which search peers are responsible for searching which groups of data. Identifiers for the search peers responsible for searching the groups of data that correspond to the data identifiers of the set of data identifiers can also be associated with the bucket map identifier.

At block 1906, the cluster master 252 communicates the bucket map identifier and a set of search peer identifiers to the search head 210. As described herein, the search head 210 can communicate the bucket map identifier and/or a portion of the query to one or more search peers corresponding to the set of search peer identifiers.

At block 1908, the cluster master 252 receives the bucket map identifier from a first search peer 206 of the one or more search peers assigned to execute the at least a portion of the query. As described herein, the cluster master 252 can, based on an identification of the first search peer, identify data identifiers corresponding to groups of data that are to be searched by the first search peer. For example, as described herein, the bucket map identifier can be associated with groups of data and search peers assigned to search the groups of data. Accordingly, based on the received bucket map identifier and the identification of the search peer, the cluster master can determine which groups of data are part of the search and which groups of data from the search are associated with the first search peer.

At block 1910, the cluster master 252 communicates a set of data identifiers to the first search peer. In some cases, each data identifier of the set of data identifiers is associated with the first search peer, and the set of data identifiers identifies a group of data that is to be searched by the first search peer. In some cases, the search peer can search the group of data locally using a local data store. In certain embodiments, the search peer can download or obtain a copy of the group of data from the shared storage system 254 and then search the copy. In some embodiments, the first search peer can be the same search peer that is processing the group of data (e.g., the indexer 206 that is processing a slice of data as part of a hot bucket) or the same search peer that processed and/or generated the group of data (e.g., the indexer 206 that generated the bucket), etc.

Fewer, more, or different blocks can be used as part of the routine 1900. In some cases, one or more blocks can be omitted. In some embodiments, the blocks of routine 1900 can be combined with any one or any combination of blocks described herein with reference to at least FIGS. 18A, 18B, 20A, and/or 20B.

2.19. Search Recovery Using a Shared Storage System Following a Failed Search Peer As described herein, the data intake and query system 108 can index and search large amounts of data using one or more indexers 206 (or search peers 206). In some cases, each indexer 206 can store a copy of the data it is processing, the results of processing the data, or a copy of the data that the indexer 206 is assigned to search, in the shared storage system 254. By storing the data in the shared storage system 254, the indexers 206 can improve data availability and resiliency. In the event an indexer 206 fails or is otherwise unable to search data that it has been assigned to search, a cluster master 252 can assign one or more second indexers 206 to search the data. In some such cases, the one or more second indexers 206 can download the data from the shared storage system 254. In this way, the data intake and query system 108 can decrease the likelihood that data that is to be searched data will not be searched due to a failed or unavailable indexer 206.

Figure 20A:
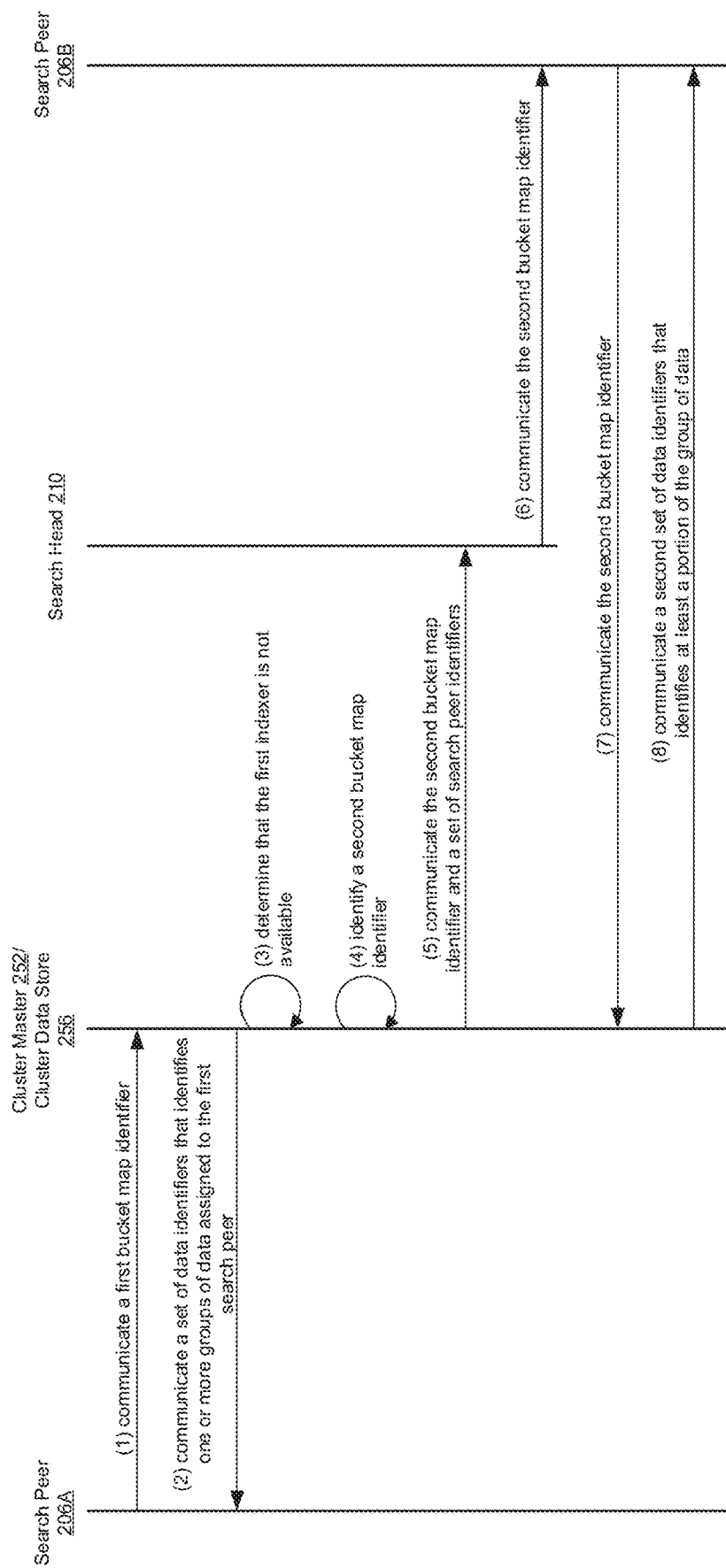
FIG. 20A is a data flow diagram illustrating an embodiment of data flow and communications illustrating an example method for search recovery using a shared storage system following a failed search peer.

FIG. 20A is a data flow diagram illustrating an embodiment of data flow and communications between a variety of the components of a distributed data processing system, such as the data intake and query system 108, for searching data following a failed search peer. The data flow diagram of FIG. 20A illustrates an example of data flow and communications between the cluster master 252, the search head 210, and two search peers 206A, 206B. However, it will be understood, that in some of embodiments, one or more of the functions described herein with respect to FIG. 20A can be omitted, performed concurrently or in a different order and/or performed by a different component of the data intake and query system 108. Accordingly, the illustrated embodiment and description should not be construed as limiting.

At (1), the first search peer 206A communicates a first bucket map identifier to the cluster master 252, and, at (2), the cluster master 252 communicates a set of data identifiers that identifies one or more groups of data that are assigned to the first search peer 206A. The interactions (1) and (2) are similar to interactions (8) and (9) of FIG. 19A, discussed above, and therefore will not be re-described.

At (3), the cluster master 252 determines that the first search peer 206A is not available. As described herein, the cluster master 252 monitors the search peers 206 (including the first search peer 206A) of the data intake and query system 108. Monitoring the search peers 206 can include requesting and/or receiving status information from the search peers 206. In some embodiments, the cluster master 252 passively receives status information from the search peers 206 without explicitly requesting the information. For example, the search peers 206 can be configured to periodically send status information updates to the cluster master 252. In certain embodiments, the cluster master 252 receives status information updates in response to requests made by the cluster master 252.

In some cases, the cluster master 252 can determine that the first search peer 206A is not available based on a determination that the first search peer 206A is busy or failing. For example, in some cases, the cluster master 252 can determine that the first search peer 206A is unavailable if one or more metrics associated with the first search peer 206A satisfies a metrics threshold. For example, the cluster master 252 can determine that the first search peer 206A is unavailable if a utilization rate of the first search peer 206A satisfies a utilization rate threshold and/or if an amount of available memory available to the first search peer 206A satisfies a memory threshold. As another example, the cluster master 252 can determine that the first search peer 206A is unavailable if an amount of available processing resources of the first search peer 206A satisfies a processing resources threshold. As a corollary, in some cases, the cluster master 252 can determine that the first search peer 206A is available based on a determination that one or more metrics associated with the first search peer 206A does not satisfy a metrics threshold.

In the event an assigned search peer 206 (in this example, the first search peer 206A) becomes unresponsive or unavailable (in some cases this may happen after that search peer has been assigned to execute a query on the group of data), the cluster master 252 can re-assign the groups of data of the unavailable search peer 206 to one or more available search peers 206, so that the one or more available search peers 206 can execute the query on the group of data. Accordingly, the data intake and query system 108 can quickly recover from an unavailable or unresponsive component without data loss and while reducing or minimizing delay.

In some cases, the data assigned to the unavailable search peer 206A can be re-assigned to a single search peer 206 (e.g., search peer 206B), and that single search peer 206 can execute queries on the all of the data that was previously assigned to the unavailable search peer 206A. In some cases, the portion of the group of data assigned to the unavailable search peer 206A can be re-assigned to multiple search peers 206, such that multiple peers 206 are used to search the data that was previously assigned to the unavailable search peer 206A.

When updating the bucket map identifiers, any one of the other search peers 206 can be assigned. For example, a search peer 206 that was already going to be part of the query execution can be assigned, or another search peer 206 that was not going to be part of the original query. In certain embodiments, the cluster master 252 assigns a new search peer irrespective of the search peers 206 used in the search. In some cases, the cluster master 252 assigns the other search peer 206 based on the status updates that the cluster master 252 receives. In some cases, the cluster master 252 can prioritize search peers 206 based on their utilization rate (assign search peers with a lower utilization rate to the data identifiers of the unavailable search peer), involvement in the query (assign search peers that are already part of the query or search peers that are not part of the query), or whether the search peer 206 processes other data (e.g., assign a search peer 206 that is set up to only execute queries), etc. Regardless, because the search peers 206 are able to download the relevant data from the shared storage system 254, the cluster master 252 can, in some embodiments, assign any one or any combination of available search peers 206 to search the groups of data that were previously assigned to the now-unavailable search peer 206A.

Although not illustrated in FIG. 20A, while the cluster master 252 determines that the first search peer 206A is not available, the search head 210 can determine that the query has not been completed. For example, the search head 210 may have not received any search results from the first search peer 206A. In some cases, the search peers 206 can intermittently provide partial results for the data they are tasked with searching. Along with the partial results, the search peers 206 can identify which groups of data were searched or what portions of the query have been completed. Accordingly, in the event the first search peer 206A stops sending partial results the search head 210 can determine which portion of the query was not completed by the first search peer 206A.

In certain embodiments, the first search peer 206A may have completed searching at least a portion of the group of data. In such embodiments, the search head 210 can request the first search peer 206A to complete the rest of the search. In the event, the search head 210 determines that the search peer 206A is no longer available (e.g., by itself or after consulting the cluster master 252), the search head 210 can construct a new query.

In certain embodiments, the new query can be a modified query. In the case that the new query is a modified query, the search head 210 can generate the modified query based on the portion of the initial search that was completed. Thus, the modified query may include a subset of groups of data compared to the initial query and/or it may include altered filter criteria. For example, If the initial search had a time range of 0-10 and results from time 1-6 were received, the modified query can include a time range of 7-10 (with other filter criteria remaining the same). As another example, if the search head 210 determines that ten groups of data were assigned to be searched by the first search peer 206A and the search peer 206A returned results for four of the ten groups of data (in a time ordered or non-time ordered fashion), the modified query can indicate that the query is to be run on the remaining six groups of data (with other filter criteria remaining the same). By running a modified query, the data intake and query system 108 can reduce time to obtain results. In embodiments where a modified query is to be run, the search head 210 can combine the results of the modified query with the results of the initial query to provide final results to a user.

In some embodiments, the new query can be same as the initial query (e.g., the search head 210 re-runs the same query). For example, rather than attempting to identify what portions of the initial query were completed successfully, and re-running only those failed portions, the system can re-run the entire query. For example, once the cluster master 252 has been updated to disassociate the unavailable search peer 206A with the relevant groups of data, the search head 210 can re-submit the filter criteria of the initial query to the cluster master 252 and request a bucket map identifier.

At (4), the cluster master 252 identifies a second bucket map identifier. Although not illustrated in FIG. 20A, in some cases, the cluster master 252 can identify the second bucket identifier in response to receiving filter criteria of the new query generated by the search head 210.

As described herein, when a search peer 206 becomes unavailable, the cluster master 252 can update bucket map identifiers associated with the now-unavailable search peer 206. For example, if a bucket map identifier entry includes reference to the unavailable search peer 206A, the cluster master 252 can replace the reference to the unavailable search peer 206A with a reference to an available search peer 206B. Similarly, if the cluster master 252 indicates that the now-unavailable search peer 206A is assigned to search one or more groups of data, the cluster master can replace the reference to the unavailable search peer 206A with references to one or more available search peers 206B. In some such embodiments, where the cluster master 252 replaces reference to an unavailable search peer 206A with reference to an available search peer 206B, the second bucket map identifier may be the same as the first bucket map identifier albeit with different associations for the data identifiers, etc.

In certain cases, the cluster master 252 can discard any/all bucket map identifiers that include reference to the now-unavailable search peer 206A. In some such embodiments, if filter criteria is then received that matches the filter criteria of the discarded bucket map identifier, the cluster master 252 may generate a new bucket map identifier by identifying groups of data that satisfy the filter criteria as described herein. In some embodiments, the cluster master 252 can automatically generate new bucket map identifiers if one or more bucket map identifiers are discarded because they were associated with an unavailable search peer 206A.

In some cases where a modified query is generated by the search head 210 and its filter criteria is received by the cluster master 252, the cluster master 252 can identify the groups of data as described herein at least with reference to (4a) of FIG. 19A. As the filter criteria of the modified query may be different this can result in the identification or generation of a different bucket map identifier than was used in the initial query.

At (5), the cluster master 252 communicates the second bucket map identifier to the search head 210. As described herein, in some cases the second bucket map identifier may be the same as the first bucket map identifier. For example, if the same search is to be re-run or the same filter criteria used, the cluster master 252 can identify the same bucket map identifier. In some such embodiments, while the bucket map identifier may be the same, it may have different associations (e.g., data identifiers associated with different search peers 206, etc.). In certain embodiments, the second bucket map identifier may be different. As described herein, the second bucket map identifier may be different because a modified query is being executed and/or the cluster master 252 invalidated bucket map identifiers associated with the first search peer 206A (and generated new ones), etc.

In addition, the cluster master 252 provides the search head 210 with a set of search peer identifiers corresponding to search peers that are to be used to execute the query (or new query). As the search peer 206A is unavailable and no longer responsible for searching data associated with the search, the set of search peer identifiers associated with the second bucket map identifier can be different from the set of search peer identifiers associated with the first bucket map identifier (even if the first and second bucket map identifiers are the same).

In the illustrated embodiment of FIG. 20A, the second search peer 206B has been assigned to search the data associated with the search peer 206A. Accordingly, at (6), the search head 210 communicates the second bucket map identifier to the second search peer 206B (along with any other search peers associated with the query as the case may be). As described herein, in some cases, the new query can include searching only data that was associated with the first search peer 206A. In some embodiments, the new query can include searching data associated with multiple search peers (e.g., based on re-running the initial query or based on the modified query).

At (7), the second search peer 206B communicates the second bucket map identifier to the cluster master 252. At (8), the cluster master 252 communicates a second set of data identifiers that identifies at least a portion of the one or more groups of data. The interactions, (7) and (8), are similar to interactions (8) and (9) of FIG. 19A, discussed above, and therefore will not be re-described.

As described herein, in some embodiments, in order for the second search peer 206B to search the relevant portion of the group of data, it may have to download the portion of the one or more groups of data from the shared storage system 254. For example, in cases where the second search peer 206B has not already searched the data, it may have to download it from the shared storage system 254. In some such embodiments, the cluster master 252 can provide the second search peer 206B with location information of the data to be searched in the shared storage system 254. In embodiments where a modified query is executed, the search head 210 can be used to combine the partial results corresponding to the initial query with the results from the modified query.

In certain embodiments, if the unavailable search peer 206A becomes available again, the cluster master 252 can re-associate the groups of data that were previously associated with it. Accordingly, in some embodiments, the second search peer 206B can be temporarily assigned to one or more groups of data associated with the first search peer 206A. In some such embodiments, the cluster master 252 can use one or more bucket map identifiers for when the first search peer 206A is available and a different set of bucket map identifiers for when the first search peer 206A is unavailable. In certain embodiments, the bucket map identifiers for when the first search peer 206A is unavailable can be generated before or after determining that the first search peer 206A is unavailable.

Figure 20B:
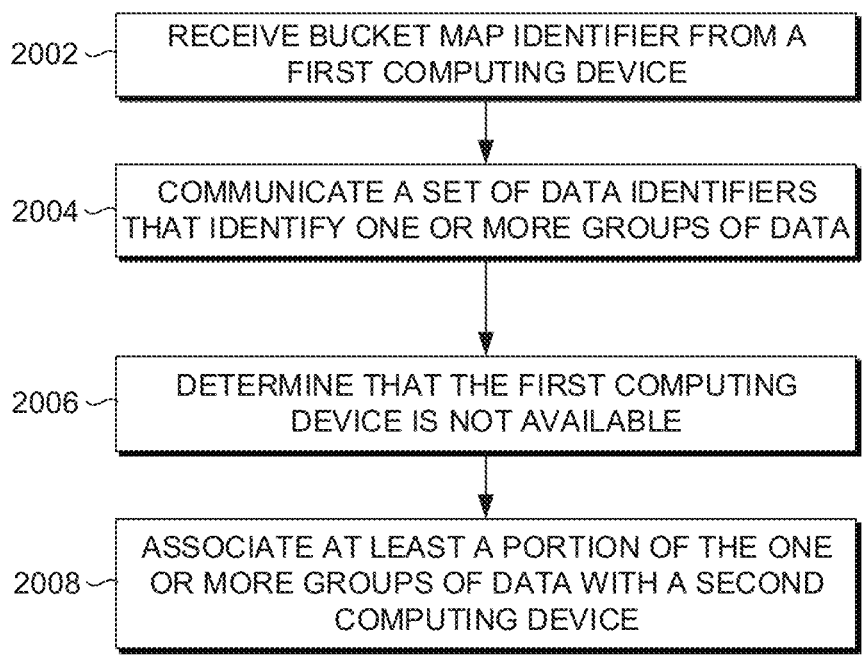
FIG. 20B is a flow diagram illustrative of an embodiment of a routine, implemented by a computing device of a distributed data processing system, for search recovery using a shared storage system following a failed search peer.

FIG. 20B is a flow diagram illustrative of an embodiment of a routine 2000 implemented by a computing device of a distributed data processing system. Although described as being implemented by the cluster master 252 of the data intake and query system 108, it will be understood that the elements outlined for routine 2000 can be implemented by one or more computing devices/components that are associated with the data intake and query system 108, such as, but not limited to, the cluster data store 256, the search head 210, the shared storage system 254, the search peer 206, etc. Thus, the following illustrative embodiment should not be construed as limiting.

At block 2002, the cluster master 252 receives a bucket map identifier from a first search peer 206A. As described herein, in some embodiments, the cluster master 252 can receive the bucket map identifier in relation to a query received by the data intake and query system 108, which is processed by a search head 210. In turn the search head 210 can obtain the bucket map identifier from the cluster master 252 and distribute it and a portion of the query to search peers (including the first search peer 206A) for execution.

As described herein, the bucket map identifier received from the first search peer can be used to identify a set of data identifiers corresponding to one or more groups of data (e.g., one or more buckets of data, slices of data or other types of data) that are to be searched by the first search peer 206A. At block 2004, the cluster master 252 communicates a set of data identifiers to the first search peer 206A.

At block 2006, the cluster master 252 determines that the first search peer 206A is not available. As described herein, the cluster master 252 can determine that the first search is not available based on a missed status update from the search peer. Separately, the search head 210 can determine that the first search peer did not execute the at least a portion of the query. For example, the search head 210 may not have received any results of the query from the search peer 206B and/or the search head 210 may have only received a portion of the results that it was expecting from the search peer 206B. In some cases, as the search peer 206A searches the group of data assigned to it, it provides results to the search head 210 along with an identification of which portion of the group of data has been searched (e.g., an identification of the bucket that was searched to provide relevant results). Based on the results received, the search head 210 can determine what portions of the group of data was searched by the search peer 206A. In certain embodiments, the cluster master 252 can perform the functions described herein with respect to the search head 210.

At block 2008, the cluster master 252 assigns at least a portion of the one or more groups of data to a second search peer 206B. In some cases, the portion of the one or more groups of data can correspond to the groups of data that were not searched. As described herein, when the cluster master 252 determines that the first search peer 206A is not available, it can assign a different search peer 206B to be responsible for searching the data that was previously assigned to the now-unavailable first search peer 206A. In certain embodiments, the cluster master 252 can assign all groups of data associated with the first search peer 206A with the second search peer 206B or with multiple search peers. In making new assignments, the cluster master 252 may retain the same bucket map identifier for a particular filter criteria and/or it may generate a new bucket map identifier.

Concurrently, the search head 210 may determine that the search was not completed by the search peer 206A. In some cases, the search head 210 may provide multiple requests to the search peer 206A for the missing search results. Based on the determination that the search was not completed, the search head 210 can run a new query. The new query can be the same as the initial query or a modified version of the initial query (a modified query). In embodiments, where the search head 210 runs a modified query that corresponds to a portion of the initial query, the search head 210 can determine which portions to of the initial query to run based on the portions that were not completed. For some types of searches, the search head 210 may track specific time ranges that have/have not been searched. For other types of searches, the search head 210 may track which results it has received for the buckets that were searched. In either case, the search head 210 can determine what portions of the query are to be re-run and generate the modified query to obtain results for the portions of the query that were not completed.

The search head 210 can send the filter criteria for the new query to the cluster master 252 and the cluster master 252 can return a bucket map identifier for the new query. In certain cases, if the new query is the same as the original query, then the cluster master 252 may return the same bucket map identifier as it had returned for the initial query (albeit with different search peers assigned to search the data). If the new query had different filter criteria (e.g., uses a different time range or identifies different buckets, etc.) or if the bucket map identifier was canceled (e.g., because it was associated with a now-unavailable search peer), the cluster master 252 can return a different bucket map identifier.

As described herein, the cluster master 252 can also provide the search head 210 with a list of the search peers 206 that are to be used in the query. Similar to the description of (6), (8), and (9), above with reference to FIG. 19A, the search head 210 can distribute portions of the new query to the identified search peers 206 along with the bucket map identifiers, the search peers 206 can communicate the bucket map identifier to the cluster master 252, and the cluster master 252 can communicate a set of data identifiers to each search peer 206. However, as described herein, the group of search peers 206 used to execute the new query can exclude the now-unavailable first search peer 206A.

Fewer, more, or different blocks can be used as part of the routine 2000. In some cases, one or more blocks can be omitted. In some embodiments, the blocks of routine 2000 can be combined with any one or any combination of blocks described herein with reference to at least FIGS. 18A-19B.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components of the data intake and query system 108 or 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 or 108 by managing computing resources configured to implement various aspects of the system (e.g., search head 210, indexers 206, etc.) and by providing access to the system to end users via a network.

When implemented as a cloud-based service, various components of the system 108 can be implemented using containerization or operating-system-level virtualization, or other virtualization technique. For example, one or more components of the system 108 (e.g., search head 210, indexers 206, etc.) can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
receiving, at a first computing device, a data identifier from a second computing device of a distributed data processing system, the data identifier identifying a set of one or more slices of data that the second computing device is assigned to process, wherein the second computing device is configured to store the set of one or more slices of data in a shared storage system and store results of processing the set of one or more slices of data in at least one of a data store associated with the second computing device or the shared storage system;
receiving, at the first computing device, location information of the set of one or more slices of data from the second computing device, the location information of the set of one or more slices of data indicating a location in the shared storage system at which the set of one or more slices of data is stored by the second computing device;
determining, using the first computing device, that the second computing device is not available prior to determining that the second computing device successfully processed the set of one or more slices of data;
assigning, using the first computing device, a third computing device of the distributed data processing system to process the set of one or more slices of data based at least in part on determining that the second computing device is not available;
providing the third computing device with the location information of the set of one or more slices of data based at least in part on assigning the third computing device to process the set of one or more slices of data, wherein the third computing device is configured to obtain the set of one or more slices of data from the location of the set of one or more slices of data in the shared storage system based at least in part on the location information of the set of one or more slices of data and process the set of one or more slices of data; and
receiving, from the third computing device, an indication that the third computing device successfully processed the set of one or more slices of data.

2. The method of claim 1, wherein said assigning the third computing device is further based at least in part on determining that the second computing device did not successfully process the set of one or more slices of data.

3. The method of claim 1, wherein said determining that the second computing device is not available is based at least in part on absence of communications from the second computing device.

4. The method of claim 1, wherein said determining that the second computing device is not available comprises determining at least one of a network failure, an error associated with the second computing device, a utilization rate of the second computing device, an amount of processing resources in use by the second computing device, or an amount of memory used by the second computing device.

5. The method of claim 1, wherein said determining that the second computing device is not available is based on a determination that the second computing device did not process the set of one or more slices of data.

6. The method of claim 1, wherein said determining that the second computing device is not available is based on a determination that the second computing device is busy or failing.

7. The method of claim 1, wherein the method further comprises deleting the set of one or more slices of data from the location of the set of one or more slices of data in the shared storage system.

8. The method of claim 1, wherein the method further comprising deleting the set of one or more slices of data from the location of the set of one or more slices of data in the shared storage system responsive to said receiving the indication that the third computing device successfully processed the set of one or more slices of data.

9. The method of claim 1, wherein the location information of the set of one or more slices of data includes a reference to the location of the set of one or more slices of data in the shared storage system.

10. The method of claim 1, wherein the set of one or more slices of data comprises raw machine data that reflects activity in an information processing environment and is produced by a first component of the information processing environment.

11. The method of claim 1, wherein the set of one or more slices of data comprises at least one of raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data.

12. The method of claim 1, wherein said assigning the third computing device to process the set of one or more slices of data is further based at least in part on communications from the third computing device.

13. The method of claim 1, wherein said assigning comprises communicating, to the third computing device, an indication of at least one of the data identifier or the location of the set of one or more slices of data in the shared storage system.

14. The method of claim 1, wherein the location of the set of one or more slices of data in the shared storage system is a first location, wherein to process the set of one or more slices of data, the third computing device is configured to:
obtain the set of one or more slices of data from the first location;
process the set of one or more slices of data to provide results; and
upload the results to a second location in the shared storage system.

15. The method of claim 1, wherein the location of the set of one or more slices of data in the shared storage system is a first location, wherein to process the set of one or more slices of data, the third computing device is configured to:
obtain the set of one or more slices of data from the first location;
process the set of one or more slices of data to provide results; and
upload the results to a second location in the shared storage system,
wherein the indication that the third computing device successfully processed the set of one or more slices of data includes an indication of the second location.

16. The method of claim 1, wherein the location of the set of one or more slices of data in the shared storage system is a first location, wherein to process the set of one or more slices of data, the third computing device is configured to:
obtain the set of one or more slices of data from the first location;
process the set of one or more slices of data to provide results, wherein the results comprise a plurality of events generated from the set of one or more slices of data; and
upload the results to a second location in the shared storage system,
wherein the results are stored in a time series bucket at the second location in the shared storage system,
wherein the indication that the third computing device successfully processed the set of one or more slices of data includes an indication of the second location.

17. The method of claim 1, wherein the location of the set of one or more slices of data in the shared storage system is a first location, wherein to process the set of one or more slices of data, the third computing device is configured to:
obtain the set of one or more slices of data from the first location;
process the set of one or more slices of data to provide results, wherein the results comprise a plurality of events generated from the set of one or more slices of data and an inverted index corresponding to the plurality of events; and
upload the results to a second location in the shared storage system,
wherein the results stored at the second location are stored in a time series bucket that is field-searchable,
wherein the indication that the third computing device successfully processed the set of one or more slices of data includes an indication of the second location.

18. The method of claim 1, wherein the shared storage system is cloud storage.

19. The method of claim 1, wherein the shared storage system is S3.

20. The method of claim 1, further comprising maintaining a database that identifies computing devices of the distributed data processing system, wherein the database associates a particular computing device of the of the distributed data processing system with a particular set of one or more slices of data assigned to be processed by that particular computing device, and wherein the database identifies a particular location of each of the particular sets of one or more slices of data.

21. The method of claim 1, further comprising:
maintaining a database that identifies computing devices of the distributed data processing system, wherein the database associates a particular computing device of the of the distributed data processing system with a particular set of one or more slices of data assigned to be processed by that particular computing device, wherein the database identifies a location of each of the particular sets of one or more slices of data; and
based at least in part on said receiving the data identifier identifying the set of one or more slices of data that the second computing device is assigned to process, updating the database to associate the second computing device with the set of one or more slices of data.

22. The method of claim 1, further comprising:
maintaining a database that identifies computing devices of the distributed data processing system, wherein the database associates a particular computing device of the of the distributed data processing system with a particular set of one or more slices of data assigned to be processed by that particular computing device, wherein the database identifies a location of each of the particular sets of one or more slices of data; and
based at least in part on said assigning the third computing device to process the set of one or more slices of data, updating the database to associate the third computing device with the set of one or more slices of data.

23. The method of claim 1, further comprising:
maintaining a database that identifies computing devices of the distributed data processing system, wherein the database associates a particular computing device of the of the distributed data processing system with a particular set of one or more slices of data assigned to be processed by that particular computing device, wherein the database identifies a location of each of the particular sets of one or more slices of data; and
based at least in part on said assigning the third computing device to process the set of one or more slices of data, updating the database to disassociate the second computing device with the set of one or more slices of data.

24. The method of claim 1, wherein the data identifier includes a tenant identifier associated with the set of one or more slices of data, wherein the tenant identifier is indicative of at least one of a particular tenant, a particular data source, a particular sourcetype, a particular host, or a particular user.

25. The method of claim 1, wherein the set of one or more slices of data is a first set of one or more slices of data, wherein the location of the set of one or more slices of data in the shared storage system is a first location in the shared storage system, wherein the method further comprises assigning the third computing device to process a second set of one or more slices of data, wherein the third computing device is configured to process a combined set of one or more slices of data to provide results, wherein the combined set of one or more slices of data comprises the first set of one or more slices of data and the second set of one or more slices of data, wherein the indication that the third computing device successfully processed the set of one or more slices of data includes an indication of a second location in the shared storage system.

26. A first computing device of a data intake and query system, the first computing device comprising:
memory; and
one or more processors coupled to the memory and configured to:
receive, from a second computing device of a distributed data processing system, a data identifier identifying a set of one or more slices of data that the second computing device is assigned to process, wherein the second computing device is configured to store the set of one or more slices of data in a shared storage system and store results of processing the set of one or more slices of data in at least one of a data store associated with the second computing device or the shared storage system;
receive, from the second computing device, location information of the set of one or more slices of data indicating a location in the shared storage system at which the set of one or more slices of data is stored by the second computing device;
determine that the second computing device is not available prior to determining that the second computing device successfully processed the set of one or more slices of data;
assign a third computing device of the distributed data processing system to process the set of one or more slices of data based at least in part on determining that the second computing device is not available;
provide the third computing device with the location information of the set of one or more slices of data based at least in part on assigning the third computing device to process the set of one or more slices of data, wherein the third computing device is configured to obtain the set of one or more slices of data from the location of the set of one or more slices of data in the shared storage system based at least in part on the location information of the set of one or more slices of data and process the set of one or more slices of data; and
receive, from the third computing device, an indication that the third computing device successfully processed the set of one or more slices of data.

27. The first computing device of claim 26, wherein the one or more processors are further configured to delete the set of one or more slices of data from the location of the set of one or more slices of data in the shared storage system.

28. The first computing device of claim 26, wherein the set of one or more slices of data comprises at least one of raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data.

29. Non-transitory computer readable media comprising computer-executable instructions that, when executed by a first computing device of a data intake and query system, cause the first computing device to:
receive, from a second computing device of a distributed data processing system, a data identifier identifying a set of one or more slices of data that the second computing device is assigned to process, wherein the second computing device is configured to store the set of one or more slices of data in a shared storage system and store results of processing the set of one or more slices of data in at least one of a data store associated with the second computing device or the shared storage system;
receive, from the second computing device, location information of the set of one or more slices of data indicating a location in the shared storage system at which the set of one or more slices of data is stored by the second computing device;
determine that the second computing device is not available prior to determining that the second computing device successfully processed the set of one or more slices of data;
assign a third computing device of the distributed data processing system to process the set of one or more slices of data based at least in part on determining that the second computing device is not available;
provide the third computing device with the location information of the set of one or more slices of data based at least in part on assigning the third computing device to process the set of one or more slices of data, wherein the third computing device is configured to obtain the set of one or more slices of data from the location of the set of one or more slices of data in the shared storage system based at least in part on the location information of the set of one or more slices of data and process the set of one or more slices of data; and receive, from the third computing device, an indication that the third computing device successfully processed the set of one or more slices of data.

30. The non-transitory computer readable media of claim 29, wherein the computer-executable instructions, when executed by the first computing device, further cause the first computing device to delete the set of one or more slices of data from the location of the set of one or more slices of data in the shared storage system.

* * * * *